United States Patent
Haruki et al.

(10) Patent No.: US 10,275,592 B2
(45) Date of Patent: Apr. 30, 2019

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Hiroyoshi Haruki, Kanagawa (JP); Fukutomo Nakanishi, Tokyo (JP); Mikio Hashimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 722 days.

(21) Appl. No.: 14/497,404

(22) Filed: Sep. 26, 2014

(65) Prior Publication Data
US 2015/0143132 A1 May 21, 2015

(30) Foreign Application Priority Data
Nov. 15, 2013 (JP) ................... 2013-237393

(51) Int. Cl.
  G06F 21/54 (2013.01)
  G06F 9/448 (2018.01)
(52) U.S. Cl.
  CPC .............. *G06F 21/54* (2013.01); *G06F 9/449* (2018.02); *G06F 2221/2125* (2013.01)
(58) Field of Classification Search
  CPC .................................. G06F 9/443; G06F 21/54
  See application file for complete search history.

(56) References Cited

U.S. PATENT DOCUMENTS

| | | | | |
|---|---|---|---|---|
| 5,265,206 A | * | 11/1993 | Shackelford | G06F 9/443 712/E9.084 |
| 5,848,232 A | * | 12/1998 | Lermuzeaux | G06F 9/443 712/E9.084 |
| 6,173,404 B1 | * | 1/2001 | Colburn | G06F 21/54 707/999.103 |
| 6,385,722 B1 | | 5/2002 | Connelly et al. | |
| 6,895,506 B1 | * | 5/2005 | Abu-Husein | G06F 21/121 380/29 |
| 7,353,400 B1 | * | 4/2008 | Folmsbee | G06F 11/08 713/190 |
| 2002/0046345 A1 | | 4/2002 | Takeuchi et al. | |

(Continued)

FOREIGN PATENT DOCUMENTS

JP  10-301772  11/1996
JP  2001-92664  4/2001

(Continued)

*Primary Examiner* — William S Powers
(74) *Attorney, Agent, or Firm* — Finnegan, Henderson, Farabow, Garrett & Dunner, L.L.P.

(57) ABSTRACT

According to an embodiment, an information processing device includes a first manager, a second manager, and a generator. The first manager loads a first class of a first object that requests execution of methods contained in a second object and a third class of a limiter configured to limit access from the first object to the methods. The second manager loads a second class of the second object. The generator generates the second object from the second class upon receiving a generation request for generating the second object from the first object, generates the limiter from the second object and the third class, and transmits the limiter to the first object.

16 Claims, 35 Drawing Sheets

(56) References Cited

U.S. PATENT DOCUMENTS

2003/0149653 A1* 8/2003 Penney ................ G06Q 40/00
                                                    705/37
2005/0234956 A1* 10/2005 Hoennig ............... G06F 9/468
2012/0254969 A1   10/2012 Khosrova et al.

FOREIGN PATENT DOCUMENTS

| JP | 2003-521063 | 7/2003 |
| JP | 2009-258772 | 11/2009 |
| JP | 2011-107834 | 6/2011 |
| JP | 2012-212431 | 11/2012 |

* cited by examiner

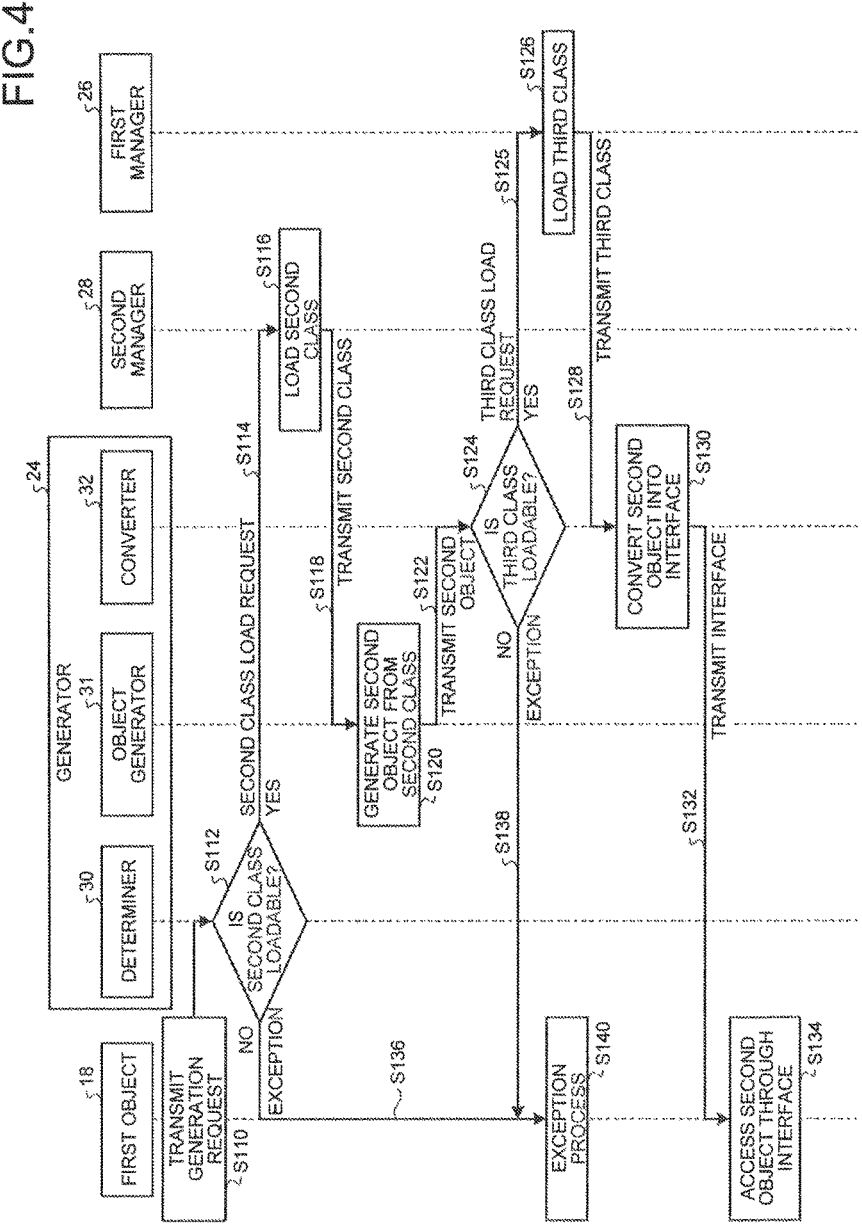

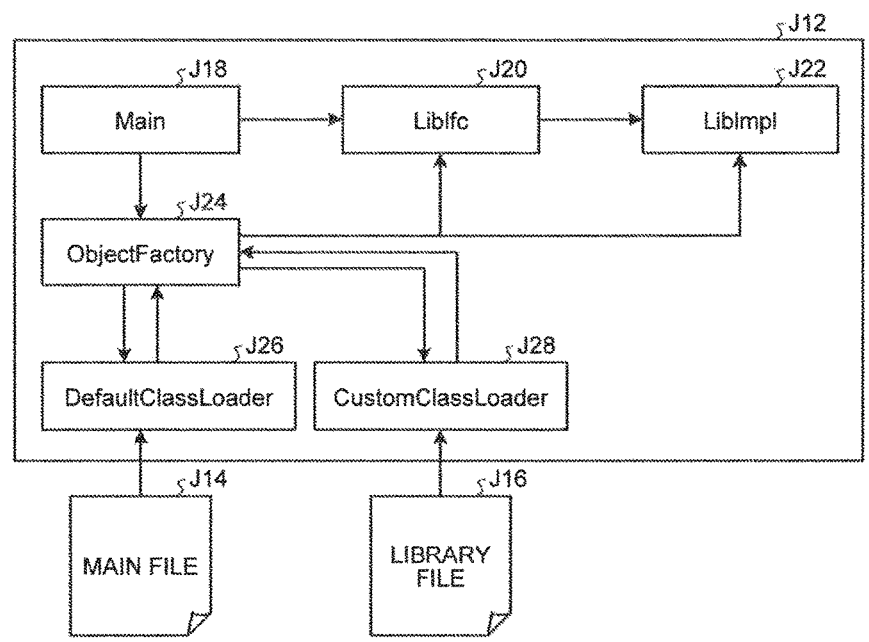

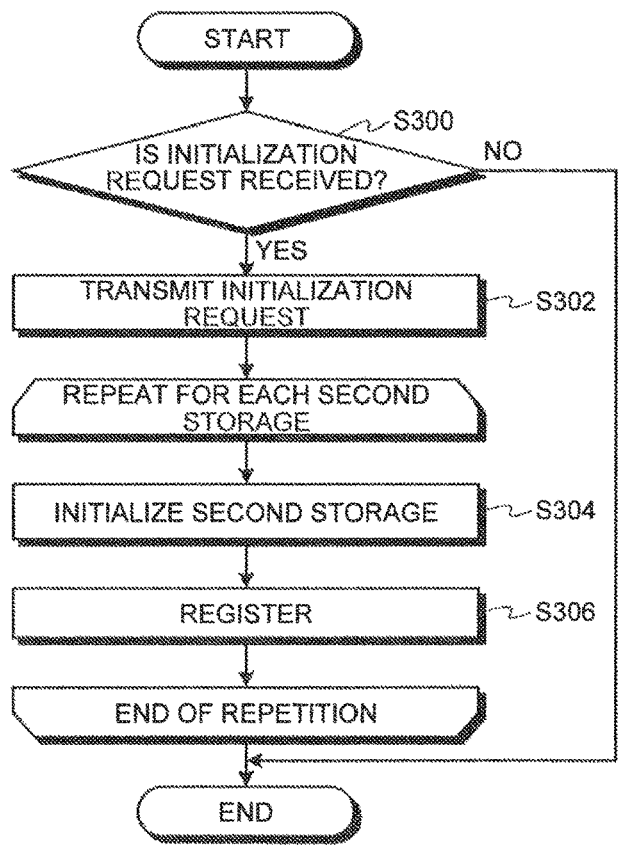

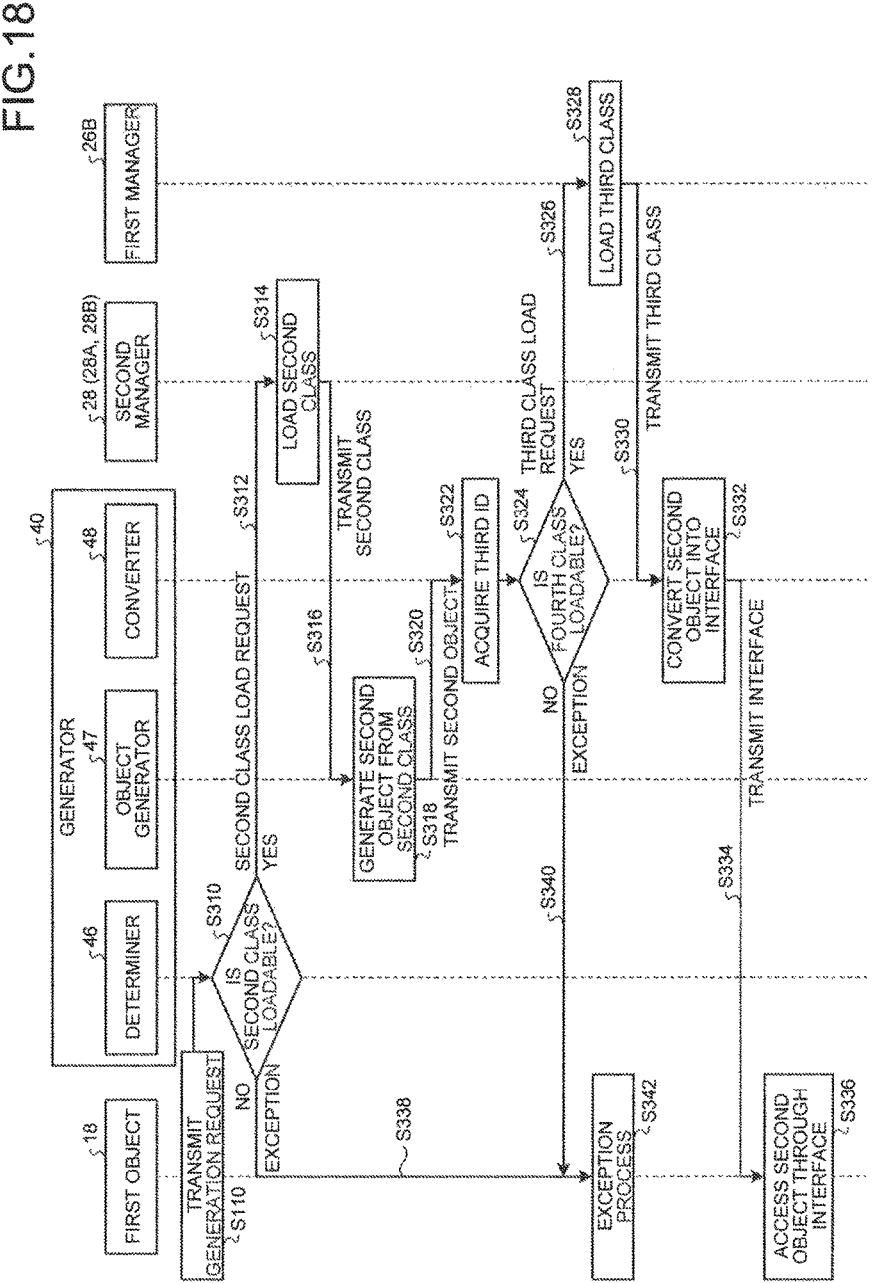

| FIRST ID (ID OF SECOND MANAGER) | INITIALIZED? | HASH VALUE |
|---|---|---|
| ... | false | |

| FIRST ID (ID OF SECOND MANAGER) | INITIALIZED? | HASH VALUE |
|---|---|---|
| ... | true | Hash(A) |

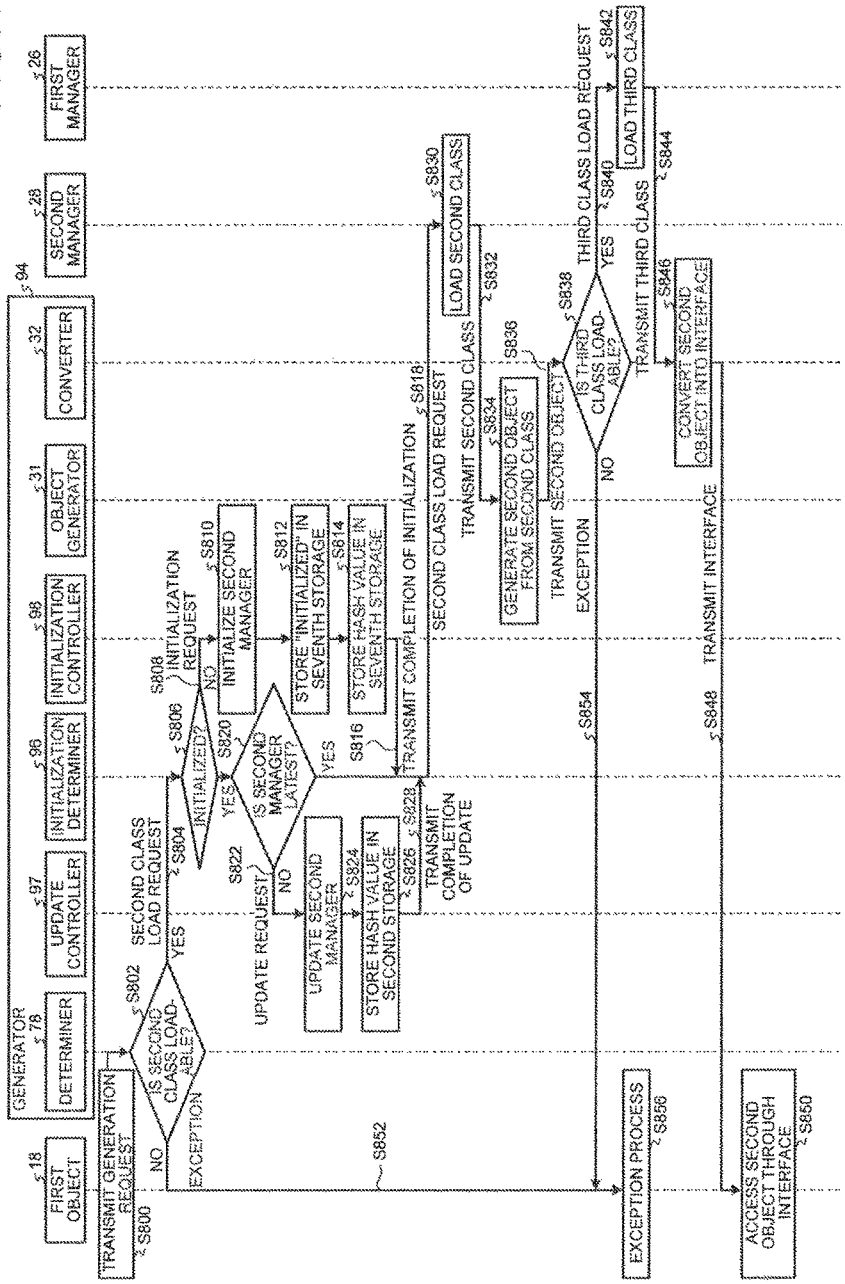

| FIRST ID (ID OF SECOND MANAGER) | INITIALIZED? | HASH VALUE |
|---|---|---|
| ... | true | Hash(B) |

42G

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2013-237393, filed on Nov. 15, 2013; the entire contents of which are incorporated herein by reference.

FIELD

Embodiments described herein relate generally to an information processing device, an information processing method, and a computer program product.

BACKGROUND

Technologies for protecting programs written in object-oriented programming languages are known. For example, a technology of distributing an encrypted program of a program written in Java (registered trademark) and decrypting the program immediately before execution is disclosed. Furthermore, a technology of using different class loaders by a plurality of objects to dynamically execute and add programs is also disclosed.

In the related art, however, access from other objects cannot be limited depending on respective methods contained in an object.

BRIEF DESCRIPTION OF THE DRAWINGS

FIG. 4 is a sequence diagram illustrating an example of operation procedures of a controller;
FIG. 5 is a block diagram of an information processing device implemented in Java (registered trademark);
FIG. 6 is a diagram illustrating an example of a configuration of LibImpl (J22);
FIG. 16 is a table illustrating an example of a data configuration of a first storage;
FIG. 17 is a flowchart illustrating an example of procedures of an initialization process;
FIG. 18 is a sequence diagram illustrating an example of operation procedures of a controller;
FIGS. 39A and 39B are tables illustrating an example of a data structure of a seventh storage;
FIG. 40 is a sequence diagram illustrating an example of operation procedures of a controller.

DETAILED DESCRIPTION

According to an embodiment, an information processing device includes a first manager, a second manager, and a generator. The first manager loads a first class of a first object that requests execution of methods contained in a second object and a third class of a limiter configured to limit access from the first object to the methods. The second manager loads a second class of the second object. The generator generates the second object from the second class upon receiving a generation request for generating the second object from the first object, generates the limiter from the second object and the third class, and transmits the limiter to the first object.

Embodiments will be described in detail below with reference to the accompanying drawings.

First Embodiment

Figure 1:
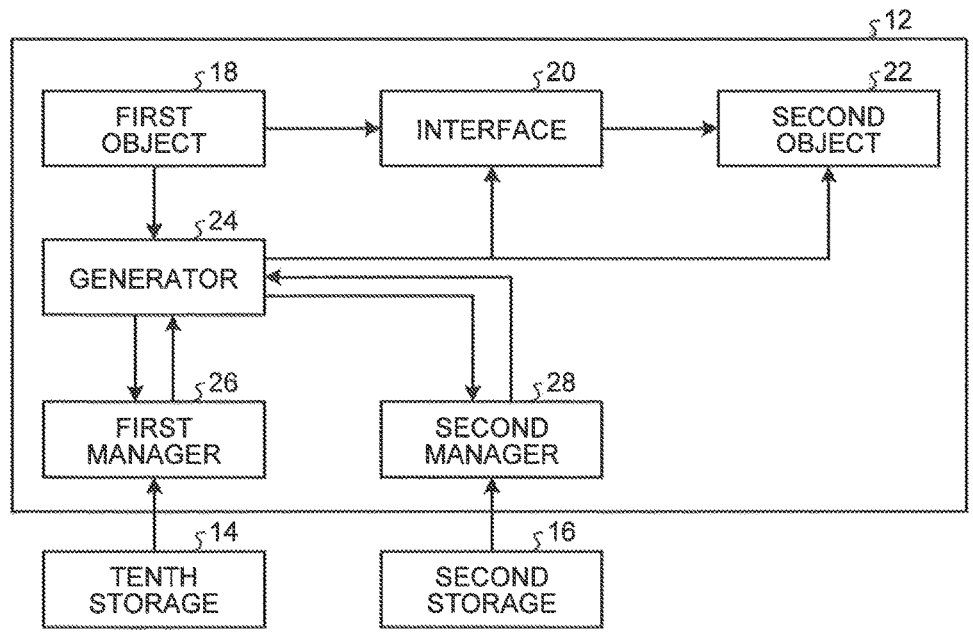
FIG. 1 is a block diagram illustrating an information processing device.

FIG. 1 is a block diagram illustrating an information processing device 10 according to the present embodiment.

The information processing device 10 includes a controller 12, a tenth storage 14, and a second storage 16.

The controller 12 controls the information processing device 10. The controller 12 executes programs written in an object-oriented programming language.

The controller 12 includes a first object 18, an interface 20, a second object 22, a generator 24, a first manager 26, and a second manager 28. The controller 12 implements the first object 18, the interface 20, the second object 22, the generator 24, the first manager 26, and the second manager 28 by executing programs stored in a read only memory (ROM), a hard disk drive (HDD), or the like.

In the present embodiment, a case in which the first object 18, the interface 20, the second object 22, the generator 24, the first manager 26, and the second manager 28 are implemented by software will be described. Note that at least part of the generator 24, the first manager 26, and the second manager 28 may be implemented by hardware such as integrated circuits (IC) or by combination of software and hardware.

The first object 18 and the second object 22 are objects in an object-oriented programming language. The first object 18 is an object that requests execution of a method contained in another object. The second object 22 is an object called by the first object 18. In other words, the second object 22 is an object requested by the first object 18 to execute a method contained in the second object 22. The second object 22 contains a plurality of methods.

In the present embodiment, a case in which the first object 18 is a requestor object that requests execution of a method contained in the second object will be described.

The interface 20 functions as a limiter to limit access from the first object 18 to the methods contained in the second object 22. The interface 20 is an interface in an object-oriented programming language. In the present embodiment, the interface 20 is information defining methods that can be accessed by the first object 18 of the methods contained in the second object 22.

The first manager 26 loads a first class and a third class. The second manager 28 loads a second class. The first class, the third class, and the second class are classes in an object-oriented programming language. The first class is a class of the first object 18. The second class is a class of the second object 22.

The third class is a class of the limiter. In the present embodiment, the third class is a class of the interface 20 that functions as the limiter. The third class has a method that can be accessed by the first object 18 of the methods contained in the second object 22, the method being written in advance by the creator of the second object 22.

The first manager 26 loads the first class of the first object 18 and the third class of the interface 20 from the tenth storage 14. The first manager 26 is initialized at the start of program execution.

The second manager 28 loads the second class of the second object 22 from the second storage 16. Upon receiving an initialization request from the first object 18 or the like, the second manager 28 is initialized by an initialization controller, which will be described later (details will be described later).

The generator 24 receives a request for generating the second object 22 from the first object 18. Upon receiving the generation request, the generator 24 generates the second object 22 from the second class. The generator 24 also generates the interface 20 from the second object 22 and the third class. The generator 24 then transmits the interface 20 to the first object 18.

To generate the interface 20 means to convert the second object 22 into the interface 20 by using the third class that is a class of the interface 20. Note that the phrase "generating a limiter" stated in the claims corresponds to converting the second object 22 into the interface 20 by the generator 24 in the present embodiment.

Upon receiving the interface 20 from the generator 24, the first object 18 transmits a request for executing a method to the second object 22 through the interface 20. Transmission of a request for executing a method to the second object 22 may also be referred to as "accessing to the second object 22" in the description.

As described above, note that the interface 20 is information defining methods that can be accessed by the first object 18 among the methods contained in the second object 22. Thus, the first object 18 can access only the methods defined in the interface 20 of the methods contained in the second object 22. Accessing the methods contained in the second object 22 from the first object 18 is thus limited by the interface 20.

The second object 22 implements methods accessed from the first object 18 through the interface 20. In other words, the first object 18 can execute the methods defined by the interface 20 of the methods contained in the second object 22.

The tenth storage 14 stores in advance a first code group for using the first object 18, a third code group for using the interface 20, and the like. The first code group describes the first class. The third code group describes the third class.

The second storage 16 stores a second code group for using the second object 22. The second code group describes the second class.

Figure 2:
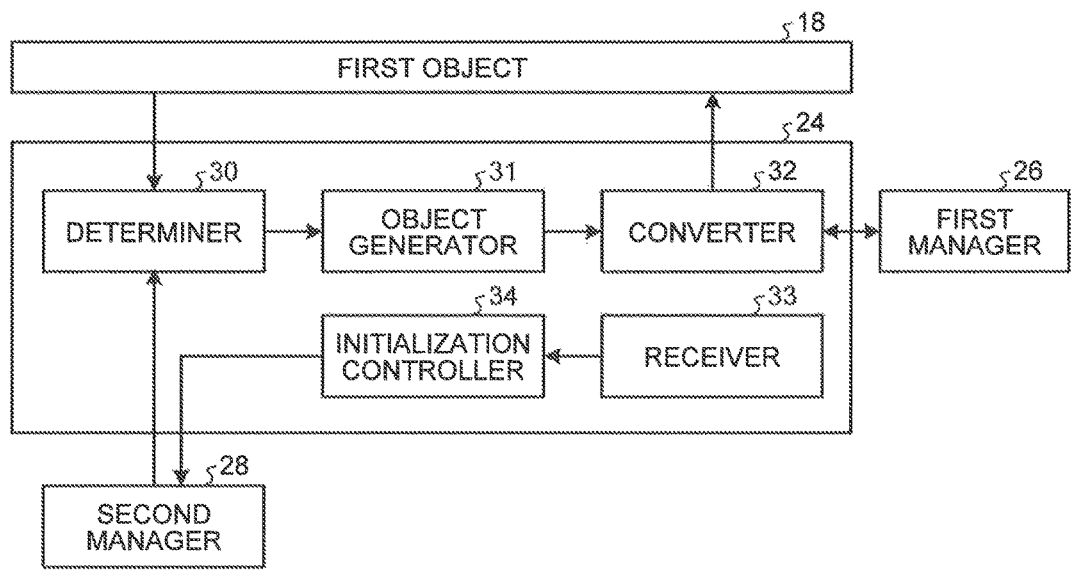
FIG. 2 is an explanatory diagram of a generator.

FIG. 2 is an explanatory diagram of the generator 24. The generator 24 includes a determiner 30, an object generator 31, a converter 32, an initialization controller 34, and a receiver 33.

The determiner 30 receives a request for generating an object from the first object 18. The determiner 30 determines whether or not the second manager 28 can load the class of the object requested to be generated.

If the second manager 28 can load the class of the object requested to be generated, the second manager 28 loads the class according to the generation request from the second storage 16. The second manager 28 transmits the loaded class to the object generator 31.

The object generator 31 generates an object from the class acquired from the second manager 28. If the class acquired from the second manager 28 is the second class, the object generator 31 generates the second object 22 from the second class. The object generator 31 then transmits the second object 22 to the converter 32.

The converter 32 converts the second object 22 into the interface 20 by using the third class. Specifically, the converter 32 acquires the third class of the interface 20 from the first manager 26. Subsequently, the converter 32 converts the second object 22 into the interface 20 by using the third class. The converter 32 transmits the interface 20 to the first object 18.

Upon receiving a request for initializing the second manager 28 from the first object 18 or the like, the receiver 33 transmits the initialization request to the initialization controller 34.

Upon receiving the initialization request from the receiver 33, the initialization controller 34 initializes the second manager 28 by using the second code group stored in the second storage 16.

Figure 3:
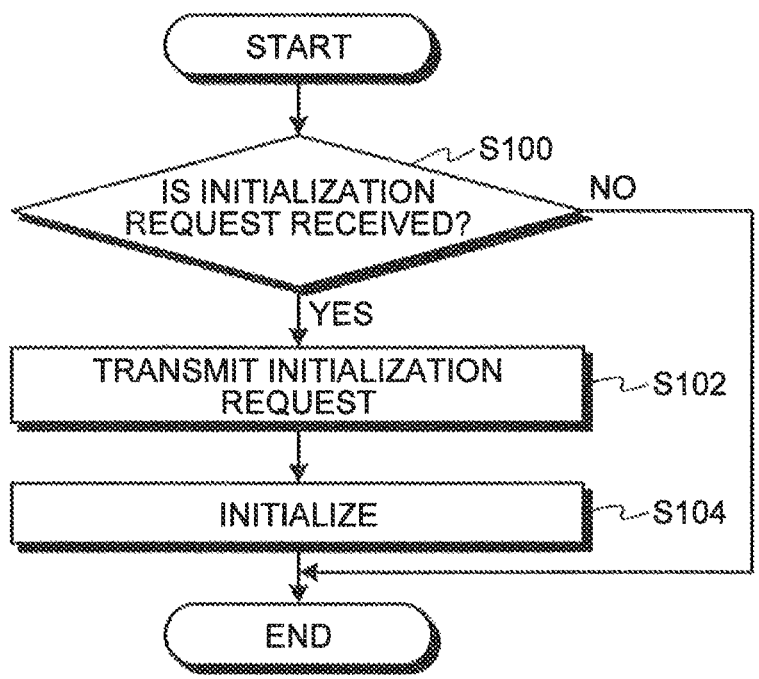
FIG. 3 is a flowchart illustrating procedures of an initialization process.

FIG. 3 is a flowchart illustrating an example of procedures of an initialization process performed by the controller 12. The controller 12 performs the initialization process before the first object 18 transmits a request for generating an object.

First, it is determined whether or not the receiver 33 has received an initialization request (step S100). If the determination in step S100 is negative (step S100: No), the present routine is terminated. If the receiver 33 has received an initialization request (step S100: Yes), on the other hand, the receiver 33 transmits the initialization request to the initialization controller 34 (step S102).

The initialization controller 34 in receipt of the initialization request initializes the second manager 28 by using the second code group stored in the second storage 16 (step S104). The present routine is then terminated.

As a result of performing the initialization process illustrated in FIG. 3 by the controller 12, the second manager 28 enters a state capable of using the second code stored in the second storage 16.

FIG. 4 is a sequence diagram illustrating an example of operation procedures of the controller 12 when the first object 18 has transmitted a request for generating another object. Note that a case in which the first object 18 transmits a request for generating the second object 22 will be described as a specific example.

First, the first object 18 transmits a request for generating the second object 22 to the generator 24 (step S110). Upon receiving the generation request from the first object 18, the determiner 30 in the generator 24 determines whether or not the second class is loadable (step S112).

In the present embodiment, the second manager 28 loads the second class of the second object 22. The determiner 30 thus determines that the second class is loadable (step S112: Yes). The determiner 30 then transmits a request for loading the second class to the second manager 28 (step S114).

The second manager 28 loads the second class for which the load request is transmitted from the determiner 30 from the second storage 16 (step S116). The second manager 28 then transmits the loaded second class to the generator 24 (step S118).

Upon receiving the second class, the object generator 31 in the generator 24 generates the second object 22 from the second class (step S120). Subsequently, the object generator 31 transmits the second object 22 to the converter 32 (step S122).

The converter 32 determines whether or not the third class is loadable (step S124).

In the present embodiment, the first manager 26 loads the third class. The converter 32 thus determines that the third class is loadable (step S124: Yes). The converter 32 then transmits a request for loading the third class to the first manager 26 (step S125).

The first manager 26 loads the third class for which the load request is transmitted from the converter 32 from the tenth storage 14 (step S126). The first manager 26 then transmits the loaded third class to the generator 24 (step S128).

Upon receiving the third class from the first manager 26, the converter 32 in the generator 24 converts the second object 22 generated by the object generator 31 into the interface 20 by using the third class (step S130). Subsequently, the converter 32 transmits the interface 20 to the first object 18 (step S132).

The first object 18 accesses the second object 22 through the interface 20 received from the converter 32 (step S134). Through the processing in step S134, the first object 18 executes methods defined by the interface 20 of the methods contained in the second object 22. Thus, the methods that can be accessed by the first object 18 of the methods contained in the second object 22 are limited to those defined by the interface 20.

Here, it is assumed in the determination of step S112 that the generation request received from the first object 18 in step S112 is a request for generating an object with a class that is not loadable by the second manager 28. In this case, the determination by the determiner 30 is negative (step S112: No). The determiner 30 then throws exception to the first object 18 (step S136). Upon catching the exception from the generator 24, the first object 18 executes an exception process (step S140).

Here, it is assumed in the determination of step S124 that the load request received by the converter 32 is a request for loading a class that cannot be loaded by the first manager 26. In this case, the determination by the converter 32 is negative (step S124: No). The converter 32 then throws exception to the first object 18 (step S138). Upon catching the exception from the generator 24, the first object 18 executes an exception process (step S140).

Next, a case in which the information processing device 10 according to the present embodiment is implemented in Java (registered trademark) that is one of object-oriented programming languages will be described. FIG. 5 is a block diagram of the information processing device 10 implemented in Java (registered trademark).

An information processing device (J10) that is the information processing device 10 implemented in Java (registered trademark) includes a program (J12), a main file (J14), and a library file (J16). The program (J12), the main file (J14), and the library file (J16) correspond to the controller 12, the tenth storage 14, and the second storage 16, respectively, illustrated in FIG. 1.

The program (J12) includes Main (J18), LibImpl (J22), LibIfc (J20), ObjectFactory (J24), DefaultClassLoader (J26), and CustomClassLoader (J28). Main (J18), LibImpl (J22), LibIfc (J20), ObjectFactory (J24), DefaultClassLoader (J26), and CustomClassLoader (J28) correspond to the first object 18, the second object 22, the interface 20, the generator 24, the first manager 26, and the second manager 28, respectively, illustrated in FIG. 1.

The main file (J14) includes at least groups of codes (a first code group, a third code group) for using Main (J18) and LibIfc (J20). The library file (J16) includes at least a second code group for using LibImpl (J22).

DefaultClassLoader (J26) is initialized by using the first code group in the main file (J14) at the start of execution of the program. At the execution of Main (J18), the classes (the first class, the third class) written in the main file (J14) are already loadable.

Upon receiving a request for generating an object, DefaultClassLoader (J26) also loads a class of the object or a class of the interface.

More specifically, DefaultClassLoader (J26) can load the first class of Main (J18) and the third class of LibIfc (J20) written in the main file (J14). DefaultClassLoader (J26), however, cannot load the second class of LibImpl (J22) written in the library file (J16).

Similarly, CustomClassLoader (J28) is initialized by using the second code group written in the library file (J16). As a result of the initialization, CustomClassLoader (J28) can load the second class written in the library file (J16).

Upon receiving a request for generating an object, CustomClassLoader (J28) also loads the class of the object or the interface.

More specifically, CustomClassLoader (J28) can load the second class of LibImpl (J22) written in the library file (J16).

ObjectFactory (J24) receives, from various objects, a request for generating another object. ObjectFactory (J24) then generates the object requested to be generated from the classes (first class, third class) loaded by DefaultClassLoader (J26) or the class (second class) loaded by the CustomClassLoader (J28). ObjectFactory (J24) then converts the generated object into the interface, and transmits the interface to the object requesting the generation.

It is assumed, for example, that Main (J18) has transmitted a request for generating LibImpl (J22) to ObjectFactory (J24). In this case, ObjectFactory (J24) generates LibIfc (J20) corresponding to LibImpl (J22), and transmits LibIfc (J20) to Main (J18). Conversion from LibImpl (J22) to LibIfc (J20) is conducted by using a cast, for example.

Thus, Main (J18) has no way to know LibImpl (J22) but can only know LibIfc (J20). Main (J18) thus accesses only predetermined methods in LibImpl (J22) through LibIfc (J20).

FIG. 6 is a diagram illustrating an example of a configuration of LibImpl (J22) corresponding to the second object 22. As illustrated in FIG. 6, it is assumed that LibImpl (J22) corresponding to the second object 22 contains three methods (sub1, sub2, sub3), each of which has an attribute "public".

Figure 7:
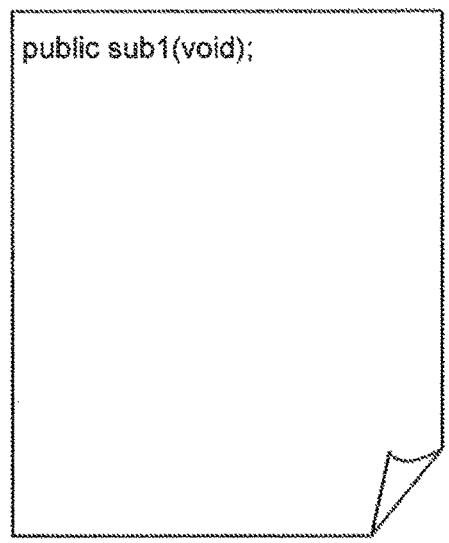
FIG. 7 is a diagram illustrating an example of a configuration of LibIfc (J20)

FIG. 7 is a diagram illustrating an example of a configuration of LibIfc (J20) corresponding to the interface 20 and implemented by using the Java (registered trademark) language. As illustrated in FIG. 7, the interface 20 defines only the method (sub1) as the method that can be accessed by Main (J18) corresponding to the first object 18 of the methods (sub1, sub2, sub3) contained in the second object 22.

As described above, Main (J18) corresponding to the first object 18 cannot execute the method of LibImpl (J22) corresponding to the second object 22 without access through LibIfc (J20) corresponding to the interface 20. Main (J18) can thus execute the method (sub1) defined by LibIfc (J20) of the methods (sub1, sub 2, sub3) contained in LibImpl (J22). Main (J18), however, cannot execute the methods (sub2, sub3) that are not defined by LibIfc (J20) of the methods (sub1, sub2, sub3) contained in LibImpl (J22).

Specifically, in the present embodiment, the first class of Main (J18) is loaded into DefaultClassLoader (J26). The second class of LibImpl (J22) is loaded into CustomClassLoader (J28). Thus, the first class of Main (J18) and the second class of LibImpl (J22) are loaded by different ClassLoaders.

For this reason, Main (J18) cannot acquire the second class LibImpl (J22) that is not loaded into DefaultClassLoader (J26).

Furthermore, even if Main (J18) transmits a request for generating LibImpl (J22) to ObjectFactory (J24), Main (J18) cannot receive LibImpl (J22). Thus, Main (J18) receives LibIfc (J20) from ObjectFactory (J24).

For this reason, Main (J18) cannot execute the methods contained in LibImpl (J22) without access through LibIfc (J20). LibIfc (J20) defines only the method (sub1) that the creator of LibImpl (J22) defined as the method that can be accessed from other objects. Main (J18) can thus execute the method (sub1) contained in LibImpl (J22). Main (J18), however, cannot execute the methods (sub2, sub3) contained in LibImpl (J22).

In contrast, such limitation depending on methods cannot be applied.

Figure 8:
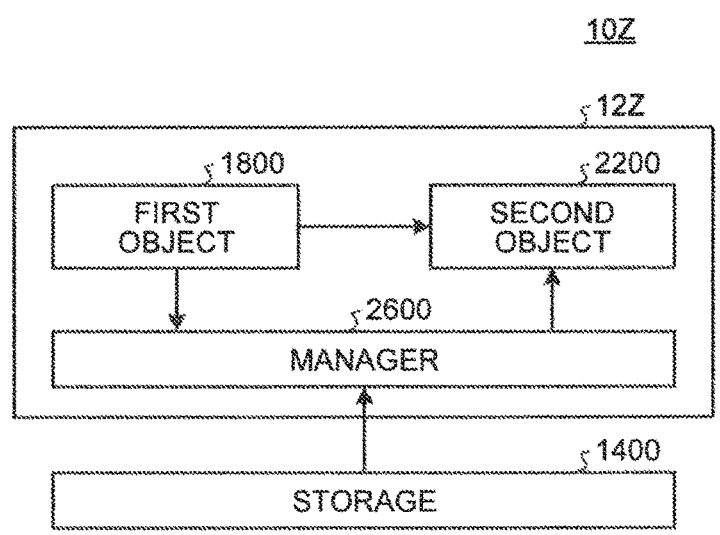
FIG. 8 is a diagram illustrating an information processing device according to the related art.

FIG. 8 is a diagram illustrating an information processing device 10Z according to the related art. The information processing device 10Z according to the related art includes a controller 12Z and a storage 1400. The controller 12Z includes a first object 1800 requesting execution of a method of another object, a second object 2200 containing a plurality of methods, and a manager 2600.

The storage 1400 stores groups of codes for executing the first object 1800 and the second object 2200 included in the controller 12Z. Specifically, the code groups are groups of codes describing the class of the first object 1800 and the class of the second object 2200. Upon receiving a request for generating another object from various objects, the manager 2600 generates the object from the code groups in the storage 1400.

In this manner, the first object 1800 can freely access all the methods contained in the second object 2200. For example, assume that the second object 2200 contains three methods (sub1, sub2, sub3) illustrated in FIG. 6. In addition, the three methods (sub1, sub2, sub3) each have an attribute "public".

In this case, access cannot be limited even when the creator of the second object 2200 wants to permit other objects to access only the method (sub 1). Specifically, for example, when the information processing device 10Z is written in Java (registered trademark), access to methods having the attribute public is allowed from every object according to the Java (registered trademark) language specification. The first object 1800 can thus access all the methods (sub1, sub2, sub3) in the second object 2200.

Specifically, in the related art, the class of the first object 1800 and the class of the second object 2200 are loaded by the same manager 2600. The first object 1800 can thus know all the methods (sub1, sub2, sub3) contained in the second object 2200 by querying the manager 2600. In other words, the first object 1800 can access all the methods (sub1, sub2, sub3) contained in the second object 2200.

In the related art, even if the creator of the second object 2200 discloses only one method (sub1, for example) to the creator of the first object 1800, it is easy to know all the methods held by the second object 22 when the information processing device 10Z is written in Java (registered trademark), for example, owing to the Java (registered trademark) language specification.

In the case of the Java (registered trademark) language, for example, each object can know a class loader that is a manager that loads the object itself (this.getClass.getClassLoader). Furthermore, each object can acquire all the classes that the manager loads by querying the manager (ClassLoader.loadClass). Each object can then know the methods held by each of the acquired classes from the class (Class.getDeclaredMethods). Each object can thus access all the methods in other objects by using the acquired method names.

Specifically, the first object 1800 can acquire identification information of all the methods (sub1, sub2, sub3) contained in the second object 2200 from the manager 2600 that loads the first object 1800. The first object 1800 can then access all the methods (sub1, sub2, sub3) identified by the acquired identification information.

In the related art, as described above, access from the first object 1800 requesting execution cannot be limited depending on the methods contained in the second object 2200 requested to execute a method.

In contrast, in the present embodiment, access from the first object 18 requesting execution can be limited depending on the methods contained in the second object 22 that receives a request for executing a method.

As described above, the information processing device 10 according to the present embodiment loads the classes (the first class, the second class) associated with the objects (the first object 18, the second object 22) individually by different managers (the first manager 26, the second manager 28). The generator 24 then transmits not the second object 22, but the interface 20 to the first object 18. The interface 20 is information defining methods that can be accessed by the first object 18 of the methods contained in the second object 22. The first object 18 accesses the second object 22 through the interface 20.

As a result, the first object 18 executes only methods defined by the interface 20 of the methods contained in the second object 22. Thus, the methods that can be accessed by the first object 18 of the methods contained in the second object 22 are limited to those defined by the interface 20.

The information processing device 10 according to the present embodiment can therefore limit access from other objects depending on methods contained in an object.

Second Embodiment

In the present embodiment, a case in which a proxy object is used as a limiter in place of the interface 20 in the first embodiment will be described. Parts that are the same as those in the embodiment described above will be designated by the same reference numerals and description thereof will not be repeated as appropriate.

Figure 9:
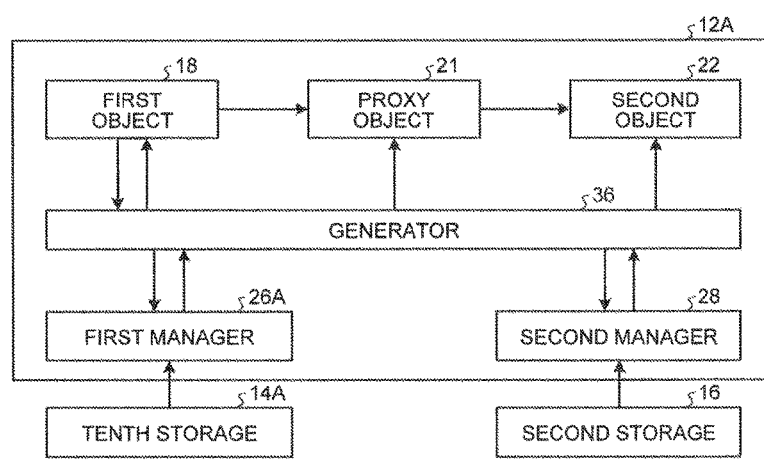
FIG. 9 is an explanatory diagram of an information processing device.

FIG. 9 is an explanatory diagram of an information processing device 10A according to the present embodiment. The information processing device 10A includes a controller 12A, a tenth storage 14A, and a second storage 16. The second storage 16 is the same as that in the first embodiment.

The controller 12A controls the information processing device 10A. The controller 12A executes programs written in an object-oriented programming language.

The controller 12A includes a first object 18, a proxy object 21, a second object 22, a generator 36, a first manager 26A, and a second manager 28. The first object 18, the second object 22, and the second manager 28 are the same as those in the first embodiment.

The controller 12A implements the first object 18, the proxy object 21, the second object 22, the generator 36, the first manager 26A, and the second manager 28 by executing programs stored in a ROM, an HDD, or the like.

The proxy object 21 is an object configured to transfer a request for calling a method that can be accessed by the first object 18 of the methods contained in the second object 22 to the second object 22 upon receiving a request for executing a method contained in the second object 22 from the first object 18. In other words, the proxy object 21 functions as a limiter that limits access from the first object 18 to the methods contained in the second object 22.

The first manager 26A loads a first class, a third class, and a fourth class. The first class is the same as that in the first embodiment. In the present embodiment, the third class is a class of the proxy object 21 that functions as the limiter.

The fourth class is a class in an object-oriented programming language. The fourth class is a class of an interface (hereinafter referred to as a second interface) defining methods that can be accessed by the first object 18 of the methods contained in the second object 22.

Specifically, the first manager 26A loads the first class and the second class from the tenth storage 14A. The first manager 26A also newly generates the third class of the proxy object 21 by using the fourth class.

In other words, the first manager 26A generates the first class, and the fourth class of the second interface. The first manager 26A also newly generates the third class of the proxy object 21 on the basis of the fourth class of the second interface. Note that the first manager 26A is initialized at the start of program execution.

The tenth storage 14A stores in advance a first code group for using the first object 18, a fourth code group for using the second interface, and the like. The first code group is the same as that in the first embodiment. The fourth code group describes the fourth class.

Upon receiving a request for generating the second object 22 from the first object 18, the generator 36 generates the second object 22 from the second class. The generator 36 also generates the proxy object 21 from the third class that is newly generated on the basis of the fourth class of the second interface. The generator 36 then transmits the proxy object 21 to the first object 18.

The phrase "generating a limiter" stated in the claims corresponds to generating the proxy object 21 by the generator 36 in the present embodiment.

Figure 10:
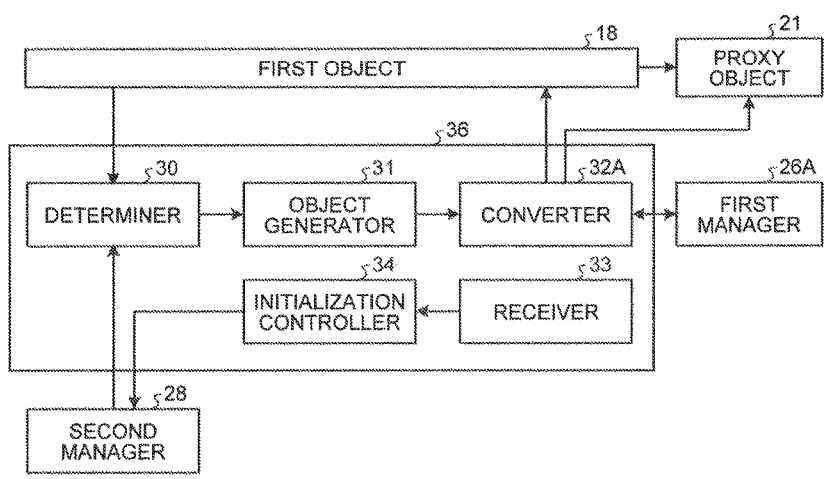
FIG. 10 is an explanatory diagram of a generator.

FIG. 10 is an explanatory diagram of the generator 36. The generator 36 includes a determiner 30, an object generator 31, a converter 32A, an initialization controller 34, and a receiver 33. The determiner 30, the object generator 31, the initialization controller 34, and the receiver 33 are the same as those in the first embodiment.

The converter 32A acquires the fourth class from the first manager 26A. The converter 32A acquires the third class of the proxy object 21 from the first manager 26A on the basis of the fourth class. The converter 32A generates the proxy object 21 from the third class. The converter 32A further transmits the proxy object 21 to the first object 18.

Figure 11:
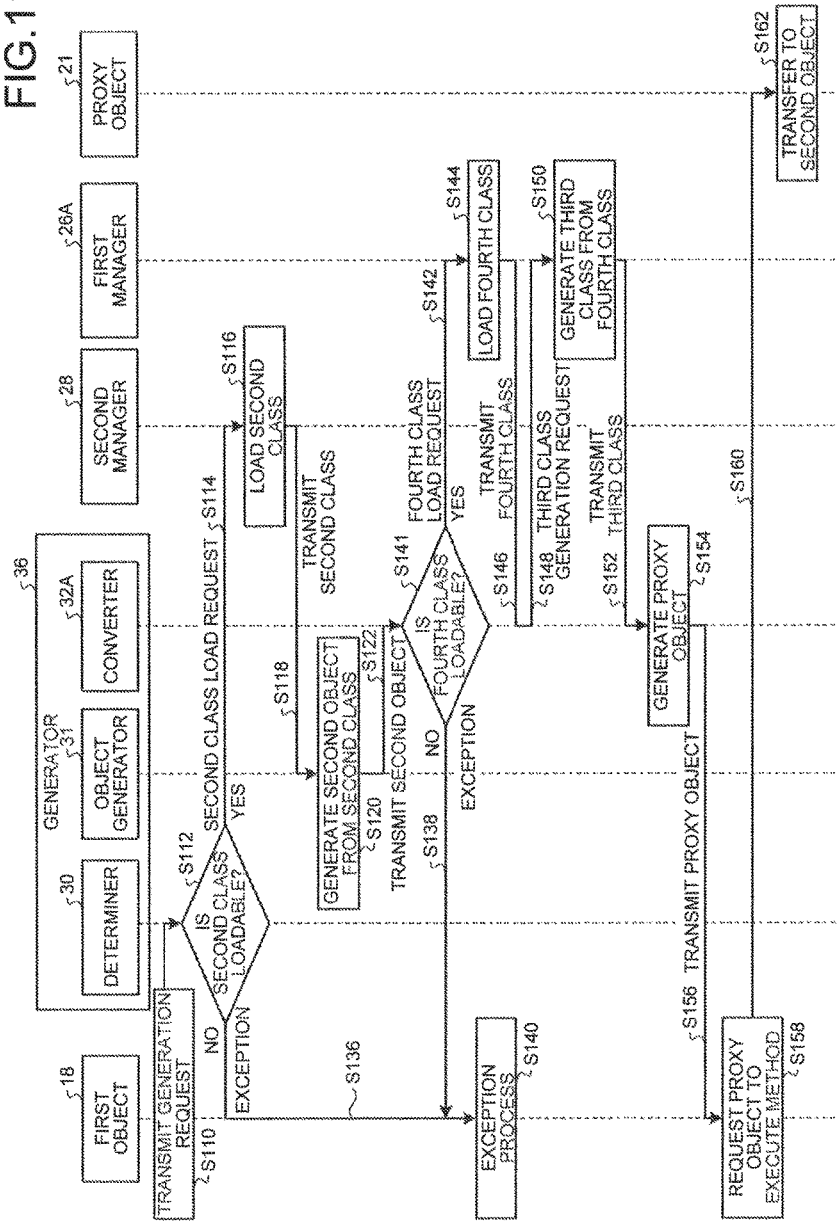
FIG. 11 is a sequence diagram illustrating an example of operation procedures of a controller.

FIG. 11 is a sequence diagram illustrating an example of operation procedures of the controller 12A when the first object 18 has transmitted a request for generating another object. Note that a case in which the first object 18 transmits a request for generating the second object 22 will be described as a specific example.

First, the controller 12A performs the processing in steps S110 to S122 similarly to the first embodiment. Subsequently, the converter 32A determines whether or not the fourth class is loadable from the first manager 26A (step S141).

In the present embodiment, the first manager 26A loads the fourth class. The converter 32A thus determines that the fourth class is loadable (step S141: Yes). The converter 32A then transmits a request for loading the fourth class to the first manager 26A (step S142).

The first manager 26A loads the fourth class for which the load request is transmitted from the converter 32A from the tenth storage 14A (step S144). Subsequently, the first manager 26A transmits the fourth class to the generator 36 (step S146).

Upon receiving the fourth class from the first manager 26A, the converter 32A in the generator 36 transmits a request for generating the third class of the proxy object 21 to the first manager 26A (step S148).

Upon receiving the request for generating the third class, the first manager 26A generates the third class from the fourth class loaded in step S144 (step S150). The first manager 26A transmits the third class to the generator 36 (step S152).

The converter 32A in the generator 36 generates the proxy object 21 from the third class received from the first manager 26A (step S154). Methods that the proxy object 21 has are only those defined by the fourth class of the second interface.

The converter 32A transmits the proxy object 21 to the first object 18 (step S156). The first object 18 requests the proxy object 21 received from the converter 32A to execute a method (step S158, step S160).

Upon receiving the request for executing a method from the first object 18, the proxy object 21 transfers the request for executing a method defined by the fourth class of the methods identified by the received execution request to the second object 22 (step S162). In other words, the proxy object 21 executes a method defined by the second interface of the methods contained in the second object 22. Methods that the proxy object 21 has are only those defined by the second interface. Thus, the proxy object 21 cannot execute methods other than those defined by the second interface of the methods contained in the second object 22.

Thus, the methods that can be accessed by the first object 18 of the methods contained in the second object 22 are limited to those contained in the proxy object 21.

Here, it is assumed in the determination of step S141 that the load request received by the converter 32A is a request for loading a class that cannot be loaded by the first manager 26A. In this case, the determination by the converter 32A is negative (step S141: No). The converter 32A then throws exception to the first object 18 (step S138). Upon catching the exception from the generator 24, the first object 18 executes an exception process (step S140).

Figure 12:
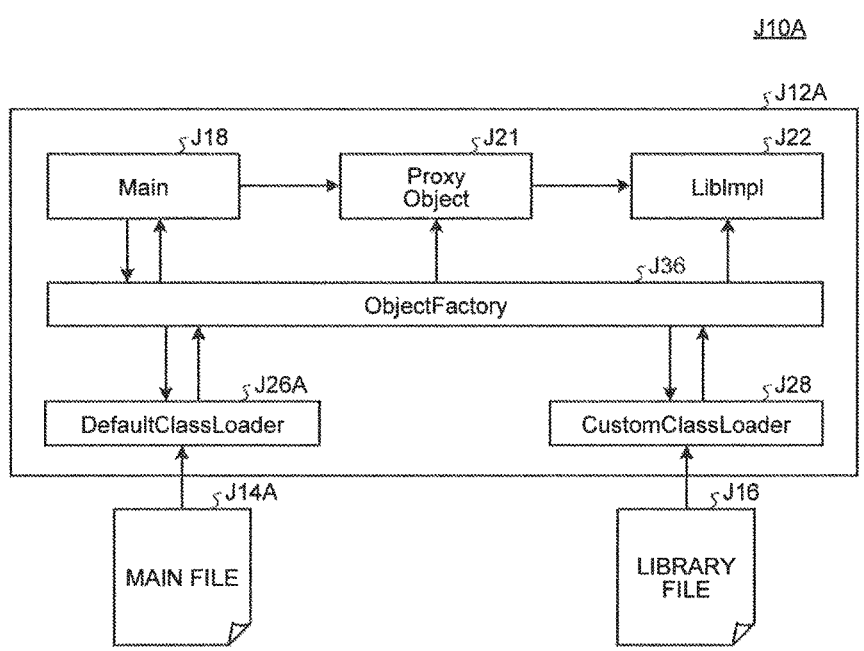
FIG. 12 is a block diagram of an information processing device implemented in Java (registered trademark)

Next, a case in which the information processing device 10A according to the present embodiment is implemented in Java (registered trademark) that is one of object-oriented programming languages will be described. FIG. 12 is a block diagram of the information processing device 10A implemented in Java (registered trademark).

An information processing device (J10A) that is the information processing device 10A implemented in Java (registered trademark) includes a program (J12A), a main file (J14A), and a library file (J16). The program (J12A), the main file (J14A), and the library file (J16) correspond to the controller 12A, the tenth storage 14A, and the second storage 16, respectively, illustrated in FIG. 9.

The program (J12A) includes Main (J18), LibImpl (J22), LibIfc (J20), ProxyObject (J21), ObjectFactory (J36), DefaultClassLoader (J26A), and CustomClassLoader (J28). Main (J18), LibImpl (J22), ProxyObject (J21), ObjectFactory (J36), DefaultClassLoader (J26A), and CustomClassLoader (J28) correspond to the first object 18, the second object 22, the proxy object 21, the generator 36, the first manager 26A, and the second manager 28, respectively, illustrated in FIG. 9.

Main (J18), LibImpl (J22), CustomClassLoader (J28), and the library file (J16) are the same as those in FIG. 5 according to the first embodiment.

The main file (J14A) includes at least groups of codes (a first code group, a fourth code group) for using Main (J18) and the second interface (not illustrated).

DefaultClassLoader (J26A) is initialized by using codes and data included in the main file (J14A). DefaultClassLoader (J26A) is thus in a state capable of loading classes (the first class, the fourth class) stored in the main file (J14A). DefaultClassLoader (J26A) also generates the first class or the fourth class in response to a request for generating each class.

Furthermore, DefaultClassLoader (J26A) can also generate the third class of ProxyObject (J21) from the fourth class in response to the generation request. The code group (the third code group) for using the proxy object 21 may be or may not be present in the main file (J14A).

In other words, DefaultClassLoader (J26A) can generate the first class of Main (J18), the fourth class of the second interface, and the third class of ProxyObject (J21). Note that DefaultClassLoader (J26A) cannot generate the second class of LibImpl (J22) in the library file (J16).

The request for generating the third class of ProxyObject (J21) transmitted to the first manager 26A can be made by using a method java.lang.reflect.Proxy.getProxyClass held by a standard library of the Java (registered trademark) language, for example.

Similarly, CustomClassLoader (J28) is initialized by using codes and data included the library file (J16). CustomClassLoader (J28) is thus in a state capable of loading the second class written the library file (J16). CustomClassLoader (J28) can also generate the second class of LibImpl (J22) written in the library file (J16).

ObjectFactory (J36) generates ProxyObject (J21) and LibImpl (J22) according to generation requests from various objects.

For example, Main (J18) transmits a request for generating LibImpl (J22) to ObjectFactory (J36). In this case, ObjectFactory (J36) generates LibImpl (J22). ObjectFactory (J36) also generates ProxyObject (J21) on the basis of the fourth class of the second interface and transmits ProxyObject (J21) to Main (J18).

For generation of ProxyObject (J21), the method java.lang.reflect.Proxy.getProxyClass mentioned above is used, for example. ObjectFactory (J36) generates the third class from DefaultClassLoader (J26A). ObjectFactory (J36) then generates, as ProxyObject (J21), a java.lang.reflect.InvocationHandler object configured to transfer a call for a method to LibImpl (J22). ObjectFactory (J36) also generates an instance of the third class by using the java.lang.reflect.InvocationHandler object.

Note that Main (J18) can call a method of ProxyObject (J21) but cannot acquire LibImpl (J22) from ProxyObject (J21). Thus, Main (J18) executes a predetermined method in LibImpl (J22) only by indirectly calling LibImpl (J22) by using a method provided by ProxyObject (J21).

Next, the fact that Main (J18) can limit access to method of LibImpl (J22) even when reflection in the Java (registered trademark) language can be used will be described.

An object can acquire a list of methods of a certain object by using reflection. For example, an object calls getClass( ).getDeclaredMethods( ) in LibImpl (J22). As a result, the object can acquire and call a list of methods of LibImpl.

Even when Main (J18) has acquired a list of methods for ProxyObject (J21), however, Main (J18) can acquire only methods defined in the fourth class of the second interface and methods of a basic class (java.lang.Object). Thus, Main (J18) cannot call methods that are not defined in the fourth class of the second interface.

The object can also acquire a class loader that has a certain object by using reflection. For example, an object calls getClass( ).getClassLoader( ) in LibImpl (J22). As a result, the object can acquire the class loader configured to load a class of LibImpl (J22), that is, CustomClassLoader (J28) and use a certain class and interface in the library file J16.

Even if Main (J18) acquires a class loader having the third class of ProxyObject (J21), however, DefaultClassLoader (J26A) is acquired. Thus, Main (J18) cannot use the second class loaded by CustomClassLoader (J28), that is, codes and data written in the library file (J16).

As described above, the information processing device 10A of the present embodiment includes the proxy object 21 in place of the interface 20 of the first embodiment. The proxy object 21 is a proxy object configured to transfer a request for calling a method that can be accessed by the first object 18 of the methods contained in the second object 22 to the second object 22 upon receiving a request for executing a method contained in the second object 22 from the first object 18.

Thus, the methods that can be accessed by the first object 18 of the methods contained in the second object 22 are limited to those contained in the proxy object 21.

The information processing device 10A according to the present embodiment can therefore limit access from other objects depending on methods contained in an object.

Third Embodiment

In the present embodiment, a case in which the number of second objects 22 requested to execute methods is more than one will be described. Parts that are the same as those in the embodiments described above will be designated by the same reference numerals and description thereof will not be repeated as appropriate.

Figure 13:
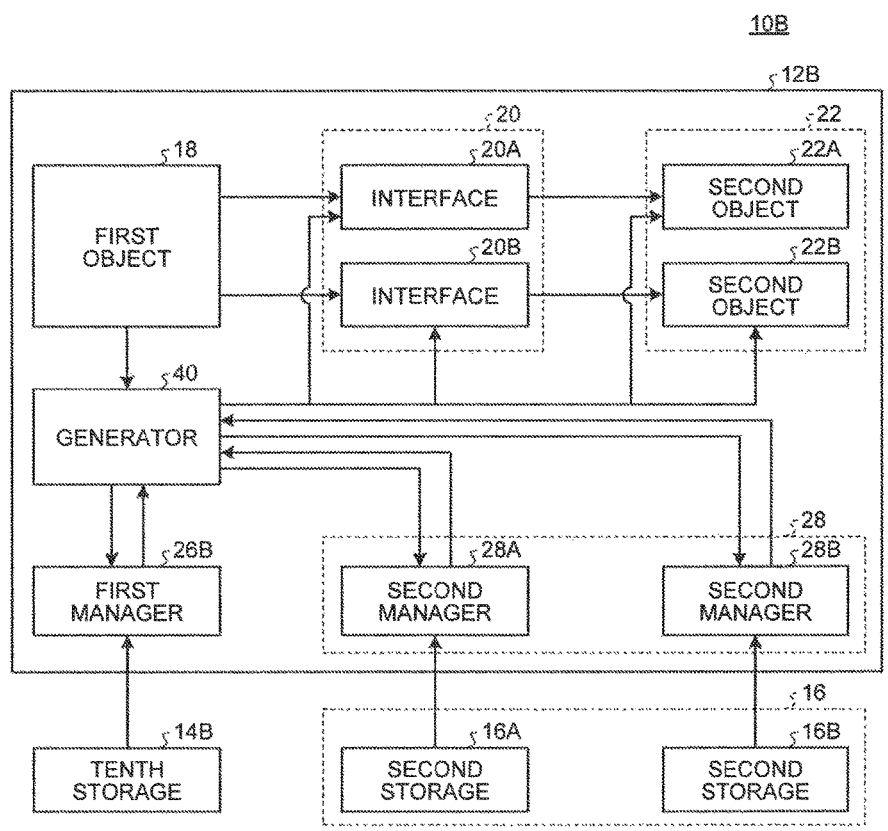
FIG. 13 is a block diagram illustrating an information processing device.

FIG. 13 is a block diagram illustrating an information processing device 10B according to the present embodiment.

The information processing device 10B includes a controller 12B, a tenth storage 14B, and a second storage 16.

The controller 12B controls the information processing device 10B. The controller 12B executes programs written in an object-oriented programming language.

The controller 12B includes a first object 18, a plurality of interfaces 20, a plurality of second objects 22, a generator 40, a first manager 26B, and a plurality of second managers 28. The controller 12B implements the first object 18, the interfaces 20, the second objects 22, the first manager 26B, and the second managers 28 by executing programs stored in a ROM, an HDD, or the like.

The first object 18 is the same as that in the first embodiment. The controller 12B has a plurality of second objects 22 requested to execute methods. Note that the second objects 22 may be objects all generated from the same class, objects generated from completely different classes, or objects some of which are generated from the same class and the others of which from a different class. In the present embodiment, a case in which a second object 22A and a second object 22B generated from different classes are provided as the second objects 22 will be described.

The second object 22A and the second object 22B are objects requested to execute methods. The second object 22A and the second object 22B each contain a plurality of methods. The second object 22A and the second object 22B may be collectively referred to as the second objects 22 in the description.

The controller 12B includes a plurality of interfaces 20 respectively associated with the second objects 22 (the second object 22A and the second object 22B). The interfaces 20 limits access to methods contained in each of the second objects 22 individually depending on the second objects 22.

In the present embodiment, the controller 12B includes an interface 20A and an interface 20B as the interfaces 20. The interface 20A and the interface 20B are interfaces in an object-oriented programming language. The interface 20A and the interface 20B may be collectively referred to as the interfaces 20 in the description.

The interface 20A is information defining methods that can be accessed by the first object 18 of the methods contained in the second object 22A. The interface 20A thus functions as a limiter configured to limit access from the first object 18 to the methods contained in the second object 22A.

The interface 20B is information defining methods that can be accessed by the first object 18 of the methods contained in the second object 22B. The interface 20B thus functions as a limiter configured to limit access from the first object 18 to the methods contained in the second object 22B.

The first manager 26B loads a first class, a third class of the interface 20A, and a third class of the interface 20B. The first manager 26B is initialized at the start of program execution.

In the present embodiment, the controller 12B includes a plurality of second managers 28. In the present embodiment, a second manager 28A and a second manager 28B are provided as the managers 28. The second managers 28 individually load the second classes of the respective second objects 22.

Specifically, the second manager 28A loads the second class of the second object 22A. The second manager 28B loads the second class of the second object 22B. As described above, the second manager 28A and the second manager 28B may be collectively referred to as the second managers 28 in the description.

In the present embodiment, as described above, a case in which the controller 12B includes two second objects 22, which are the second object 22A and the second object 22B, generated from different classes as the second objects 22 will be described. The controller 12B also includes two interfaces 20 (the interface 20A, the interface 20B), two second managers 28 (the second manager 28A, the second manager 28B), and two second storages 16 (a second storage 16A, a second storage 16B).

The second storage 16A stores a second code group for using the second object 22A. The second class of the second object 22A is written in the second code group. The second storage 16B includes a second code group for using the second object 22B. The second class of the second object 22B is written in the second code group. Thus, the second class included in the second storage 16A is a class used for generation of the second object 22A, the second class stored in the second storage 16B is a class used for generation of the second object 22B, and the second classes are different classes.

The second manager 28A loads the second class of the second object 22A from the second storage 16A. The second manager 28B loads the second class of the second object 22B from the second storage 16B.

The interface 20A functions as a limiter configured to limit access from the first object 18 to the methods contained in the second object 22A. In the present embodiment, the interface 20A is information defining methods that can be accessed by the first object 18 of the methods contained in the second object 22A.

The interface 20B functions as a limiter configured to limit access from the first object 18 to the methods contained in the second object 22B. In the present embodiment, the interface 20B is information defining methods that can be accessed by the first object 18 of the methods contained in the second object 22B.

In the present embodiment, note that the second objects 22 requested to execute methods may be any second objects 22 generated from different classes, and that the number of the second objects 22 may be three or larger. In this case, the numbers of the interfaces 20, the second managers 28, and the second storages 16 correspond to the number of the second objects 22.

The tenth storage 14B stores in advance a first code group for using the first object 18, a third code group for using the interface 20A, a third code group for using the interface 20B, and the like. The first code group describes the first class. The third class of the interface 20A is written in the third code group for using the interface 20A. The third class of the interface 20B is written in the third code group for using the interface 20B.

The first manager 26B loads the second class of the second object 22A from the tenth storage 14B. The first manager 26B also loads the third class of the interface 20A requested to be generated from the tenth storage 14B. The first manager 26B also loads the third class of the interface 20B requested to be generated from the tenth storage 14B. Thus, the first manager 26B can generate the first class of the first object 18, the third class of the interface 20A, and the third class of the interface 20B.

The second manager 28A loads the second class of the second object 22A from the second storage 16A. The second manager 28A then transmits the loaded second class of the second object 22A to the generator 40. Thus, the second manager 28A can generate at least the second class of the second object 22A.

The second manager 28B loads the second class of the second object 22B from the second storage 16B. The second manager 28B then transmits the loaded second class of the second object 22B to the generator 40. Thus, the second manager 28B can generate at least the second class of the second object 22B.

Upon receiving a request for generating the second object 22A, the generator 40 generates the second object 22A from the second class of the second object 22A. The generator 40 also generates the interface 20A from the second object 22A and the third class of the interface 20A. The generator 40 then transmits the interface 20A to the first object 18.

Meanwhile, upon receiving a request for generating the second object 22B, the generator 40 generates the second object 22B from the second class of the second object 22B. The generator 40 also generates the interface 20B from the second object 22B and the third class of the interface 20B. The generator 40 then transmits the interface 20B to the first object 18.

Figure 14:
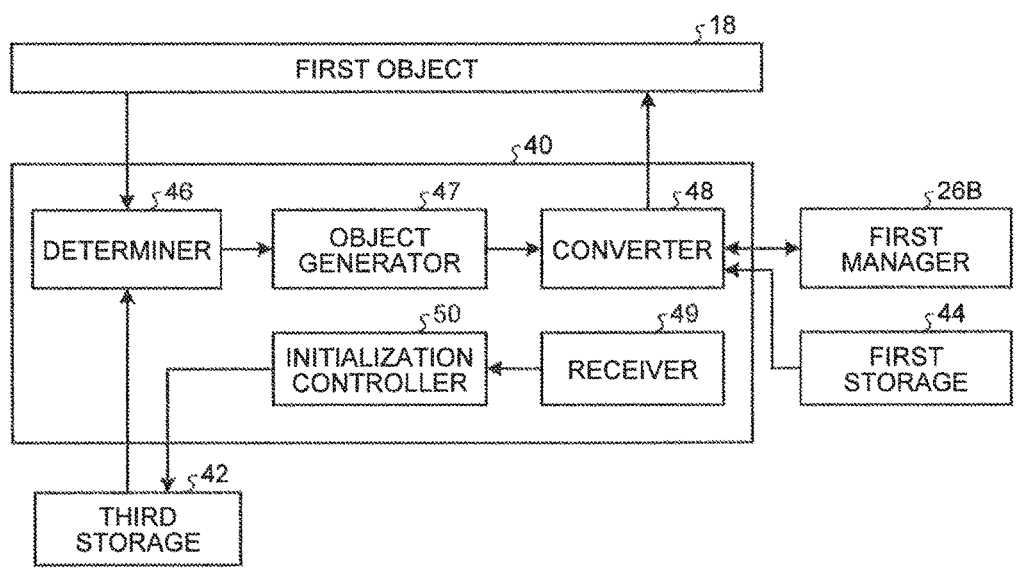
FIG. 14 is an explanatory diagram of a generator.

FIG. 14 is an explanatory diagram of the generator 40. The generator 40 includes a determiner 46, an object generator 47, a converter 48, an initialization controller 50, and a receiver 49. In the present embodiment, the information processing device 10B includes a third storage 42 and a first storage 44.

The third storage 42 stores first identification information of a second manager 28 initialized by the initialization controller 50 of the plurality of second managers 28. In other words, the third storage 42 stores first identification information of a second manager 28 in a state capable of being used by the controller 12B of the plurality of second managers 28. The first identification information is information capable of uniquely identifying each of the second managers 28.

Figure 15:
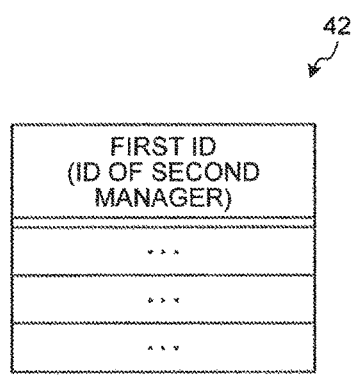
FIG. 15 is a table illustrating an example of a data configuration of a third storage.

FIG. 15 is a table illustrating an example of the data configuration of the third storage 42. As illustrated in FIG. 15, the third storage 42 stores the first identification information (refer to FIRST ID in FIG. 15) that is identification information (ID) of an initialized second manager 28.

The first storage 44 stores second identification information and third identification information in association with each other. The second identification information is information uniquely identifying each of second classes associated with the respective second objects 22. The third identification information is information uniquely identifying each of third classes of the interfaces 20 associated with the respective second objects 22.

FIG. 16 is a table illustrating an example of the data configuration of the first storage 44. As illustrated in FIG. 16, the first storage 44 stores the second identification information (refer to SECOND ID in FIG. 16) and the third identification information (refer to THIRD ID in FIG. 16) in association with each other. The third information is identification information of a third class of an interface 20 (the interface 20A or the interface 20B) associated with a second object (the second object 22A or the second object 22B) of a second class identified by associated second identification information.

The description refers back to FIG. 14, in which the determiner 46 receives a request for generating an object from the first object 18. The determiner 46 determines whether or not any of the second managers 28 can load the class of the object requested to be generated.

If any of the second managers 28 can load the class of the object requested to be generated of the second objects 22, the second manager 28 that can load the class loads the second class associated with the second object 22A or the second object 22B requested to be generated from the associated second storage 16 (the second storage 16A or the second storage 16B). The second manager 28 that has loaded the second class of the plurality of second managers 28 transmits the loaded second class to the object generator 47.

The object generator 47 generates an object from the second class acquired from the second manager 28A or the second manager 28B. When the second class of the second object 22A is acquired from the second manager 28A, the object generator 47 generates the second object 22A from the second class. The object generator 47 then transmits the second object 22A to the converter 48.

When the second class of the second object 22B is acquired from the second manager 28B, the object generator 47 generates the second object 22B from the second class. The object generator 47 then transmits the second object 22B to the converter 48.

The converter 48 reads the third identification information associated with the second identification information of the second class of the second object 22A or the second object 22B generated by the object generator 47 from the first storage 44. The converter 48 then acquires the third class of the interface 20 (the interface 20A or the interface 20B) identified by the read third identification information from the first manager 26B that loads the third class. The converter 48 then converts the second object 22 (the second object 22A or the second object 22B) generated by the object generator 47 into the associated interface 20 (the interface 20A or the interface 20B) by using the third class. The converter 48 transmits the interface 20 (the interface 20A or the interface 20B) obtained by the conversion to the first object 18.

Upon receiving a request for initializing the second manager 28 from the first object 18, the receiver 49 transmits the initialization request to the initialization controller 50. Upon receiving the initialization request, the initialization controller 50 initializes each of the second managers 28 (the second manager 28A and the second manager 28B). Specifically, the initialization controller 50 initializes the second manager 28A by using the second code group stored in the second storage 16A. The initialization controller 50 also initializes the second manager 28B by using the second code group stored in the second storage 16B.

FIG. 17 is a flowchart illustrating an example of procedures of an initialization process performed by the controller 12B. The controller 12B performs the initialization process before the first object 18 transmits a request for generating an object.

First, it is determined whether or not the receiver 49 has received an initialization request (step S300). If the determination in step S300 is negative (step S300: No), the present routine is terminated. If the receiver 49 has received an initialization request (step S300: Yes), on the other hand, the receiver 49 transmits the initialization request to the initialization controller 50 (step S302).

The initialization controller 50 in receipt of the initialization request repeats processing in steps S304 to S306 for each of the second storages 16 (the second storage 16A, the second storage 16B) included in the information processing device 10B. The present routine is then terminated.

In step S304, the initialization controller 50 initializes the second manager 28 (the second manager 28A or the second manager 28B) associated with the second storage 16 (the second storage 16A or the second storage 16B) to be processed of the plurality of second managers provided in the information processing device 10B (step S304).

Subsequently, the initialization controller 50 registers the first identification information of the second manager 28 (the second manager 28A or the second manager 28B) initialized in step S304 into the third storage 42 (step S306; refer to FIG. 15). The repetition is then terminated.

FIG. 18 is a sequence diagram illustrating an example of operation procedures of the controller 12B when the first object 18 has transmitted a request for generating another object.

Note that a case in which the first object 18 transmits a request for generating the second object 22B will be described as a specific example. The same processing is performed in a case in which the first object 18 transmits a request for generating the second object 22A.

First, the first object 18 transmits a request for generating the second object 22B to the generator 40 (step S110). Upon receiving the generation request from the first object 18, the determiner 46 in the generator 40 determines whether or not any (the second manager 28A or the second manager 28B) of the plurality of second manager 28 can load the second class of the second object 22B (step S310).

In the present embodiment, the second manager 28B loads the second class of the second object 22B. The determiner 46 thus determines that the second class of the second object 22B is loadable (step S310: Yes). The determiner 46 then transmits a request for loading the second class of the second object 22B to the second manager 28B (step S312).

Subsequently, the controller 12B performs processing in steps S314 to S320 similarly to steps S116 to S122 in the first embodiment.

Specifically, the second manager 28B loads the second class of the second object 22B for which the load request is transmitted from the determiner 46 from the second storage 16B (step S314). The second manager 28B then transmits the loaded second class to the generator 40 (step S316).

Upon receiving the second class of the second object 22B, the object generator 47 in the generator 40 generates the second object 22B from the second class (step S318).

Subsequently, the object generator 47 transmits the second object 22B to the converter 48 (step S320).

Subsequently, the converter 48 acquires the third identification information of the interface 20B associated with the second identification information of the second class of the second object 22B received from the object generator 47 from the first storage 44 (step S322).

Subsequently, the converter 48 determines whether or not the third class identified by the third identification information acquired in step S322 is loadable (step S324). For example, if the third class identified by the third identification information acquired in step S322 is the third class of the interface 20B, the converter 48 determines whether or not the third class identified by the third identification information is loadable from the first manager 26B.

Subsequently, the controller 12B performs processing in steps S324 to S336 similarly to steps S124 to S140 in the first embodiment.

Specifically, if the third class is determined to be loadable (step S324: Yes), the converter 48 transmits a request for loading the third class to the first manager 26B (step S326). For example, the converter 48 transmits a request for loading the third class of the interface 20B to the first manager 26B.

The first manager 26B loads the third class of the interface 20B for which the load request is transmitted from the converter 48 from the tenth storage 14B (step S328). The first manager 26B then transmits the loaded third class to the generator 40 (step S330).

Upon receiving the third class of the interface 20B from the first manager 26B, the converter 48 of the generator 40 converts the second object 22B generated by the object generator 47 into the interface 20B by using the third class (step S332). Subsequently, the converter 48 transmits the interface 20B to the first object 18 (step S334).

The first object 18 accesses the second object 22B through the interface 20B received from the converter 48 (step S336).

Here, it is assumed in the determination of step S310 that the generation request received from the first object 18 is a request for generating an object with a class that is not loadable by any of the second managers 28 (the second manager 28A, the second manager 28B). In this case, the determination by the determiner 46 is negative (step S310: No). The determiner 46 then throws exception to the first object 18 (step S338). Upon catching the exception from the generator 40, the first object 18 executes an exception process (step S342).

Here, it is assumed in the determination of step S324 that the load request received by the converter 48 is a request for loading a class that cannot be loaded by the first manager 26B. In this case, the determination by the converter 48 is negative (step S324: No). The converter 48 then throws exception to the first object 18 (step S340). Upon catching the exception from the generator 40, the first object 18 executes an exception process (step S342).

Note that the case in which the first object 18 transmits a request for generating the second object 22B is described above as a specific example. The same processing, however, is performed in a case in which the first object 18 transmits a request for generating the second object 22A. Specifically, when the first object 18 transmits a request for generating the second object 22A to the generator 40, the determiner 46, the object generator 47, the converter 48, the second managers 28, and the first manager 26B may each perform processing on information (the second class of the second object 22A, the third class of the interface 20A, the second object 22A, the second storage 16A) associated with the second object 22A for which the generation request is made.

As described above, in the present embodiment, a plurality of second objects 22 (the second object 22A, the second object 22B) are assumed as the second objects 22 requested to execute methods. Furthermore, in the present embodiment, the numbers of the interfaces 20 (the interface 20A, the interface 20B), the second managers 28 (the second manager 28A, the second manager 28B), and the second storages 16 (the second storage 16A, the second storage 16B) included in the information processing device 10B correspond to the number of the second objects 22. Furthermore, the first manager 26B loads the first class of the first object 18, the third class of the interface 20A, and the third class of the interface 20B.

The information processing device 10B also includes the first storage 44 and the third storage 42. The first storage 44 stores the second identification information uniquely identifying each of the second classes associated with the respective second objects 22 and the third identification information uniquely identifying each of the third classes of the interfaces 20 associated with the respective second objects 22.

In this manner, the information processing device 10B of the present embodiment includes a plurality of second objects 22 requested to execute methods. Furthermore, the information processing device 10B loads the second classes of the second objects 22 individually by the second managers 28. The controller 12B can then easily acquire the third class of the interface 20 associated with a second object 22 requested to execute methods of the plurality of second managers 28 by acquiring the third identification information associated with the second identification information of the second class of the second object 22 requested to execute methods stored in the first storage 44. Thus, the information processing device 10B of the present embodiment can limit access to methods contained in each of the plurality of second objects 22 similarly to the case in which the number of the second objects 22 requested to execute methods is one.

The information processing device 10B of the present embodiment can therefore limit access from other objects depending on methods contained in each of the second objects 22 in addition to the effects of the first embodiment.

Fourth Embodiment

In the present embodiment, a case in which encrypted data are stored in a second storage 16 will be described. Parts that are the same as those in the embodiments described above will be designated by the same reference numerals and description thereof will not be repeated as appropriate.

Figure 19:
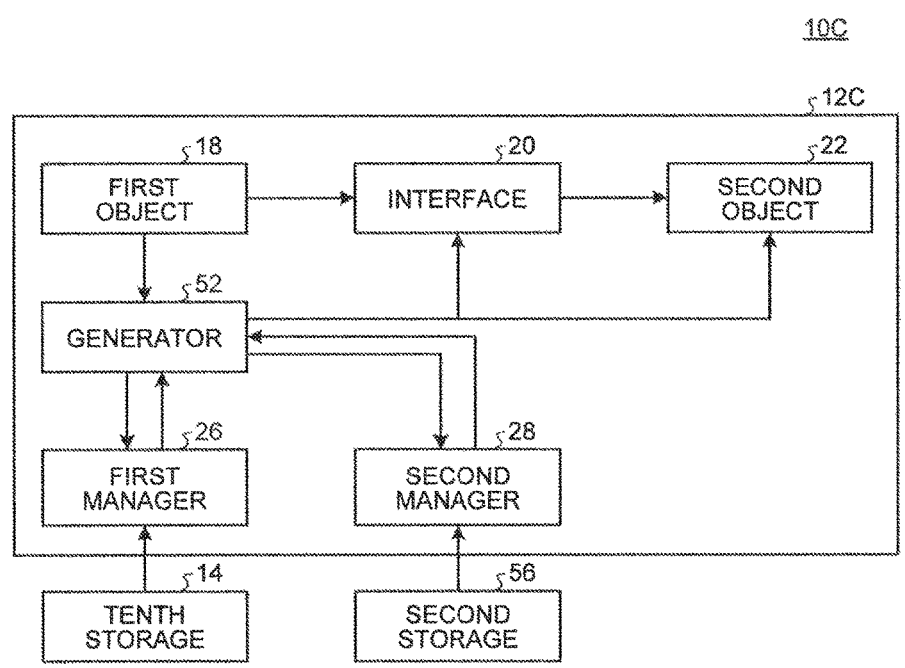
FIG. 19 is a block diagram illustrating an information processing device.

FIG. 19 is a block diagram illustrating an information processing device 10C according to the present embodiment.

The information processing device 10C includes a controller 12C, a tenth storage 14, and a second storage 56. The tenth storage 14 is the same as that in the first embodiment.

The controller 12C controls the information processing device 10C. The controller 12C executes programs written in an object-oriented programming language.

The controller 12C includes a first object 18, an interface 20, a second object 22, a generator 52, a first manager 26, and a second manager 28. The controller 12C implements the first object 18, the interface 20, the second object 22, the generator 52, the first manager 26, and the second manager 28 by executing programs stored in a ROM, an HDD, or the like. The first object 18, the interface 20, the second object 22, the first manager 26, and the second manager 28 are the same as those in the first embodiment.

The second storage 56 stores encrypted data of a second code group describing a second class. Thus, the second storage 56 stores encrypted data of the second class of the second object 22.

Upon receiving a request for generating the second object 22, the generator 52 generates the second object 22 from the second class. In this process, the generator 52 decrypts the encrypted data (details will be described later). The generator 52 also generates the interface 20 from the second object 22 and the third class similarly to the generator 24 in the first embodiment. The generator 52 then transmits the interface 20 to the first object 18.

Figure 20:
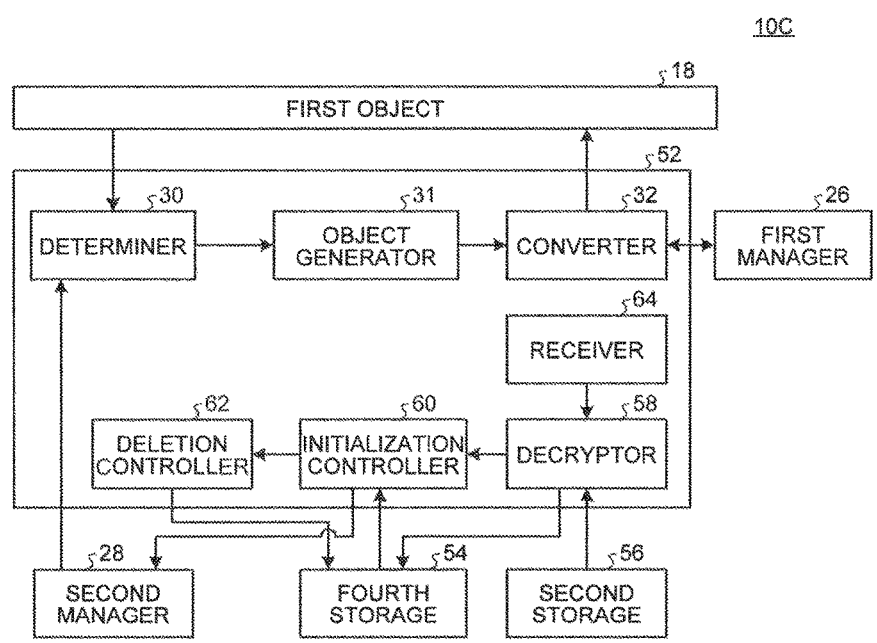
FIG. 20 is an explanatory diagram of a generator.

FIG. 20 is an explanatory diagram of the generator 52. The generator 52 includes a determiner 30, an object generator 31, a converter 32, a deletion controller 62, an initialization controller 60, a receiver 64, and a decryptor 58. The determiner 30, the object generator 31, and the converter 32 are the same as those in the first embodiment. As illustrated in FIG. 20, the information processing device 10C further includes a fourth storage 54.

The fourth storage 54 stores a plaintext (not encrypted) second code group. The fourth storage 54 cannot be accessed from the first object 18, a debugger that is software supporting detection and correction of faults in programs, or the like.

Upon receiving a request for initializing the second manager 28 from the first object 18 or the like, the receiver 64 transmits the initialization request to the decryptor 58.

The decryptor 58 reads and decrypts encrypted data from the second storage 56. The decryptor 58 then stores decrypted data in the fourth storage 54. Thus, the fourth storage 54 stores the decrypted second code group of the second object 22.

Upon receiving the initialization request, the initialization controller 60 initializes the second manager 28 by using the second code group stored in the fourth storage 54. The deletion controller 62 deletes the second code group stored in the fourth storage 54.

Figure 21:
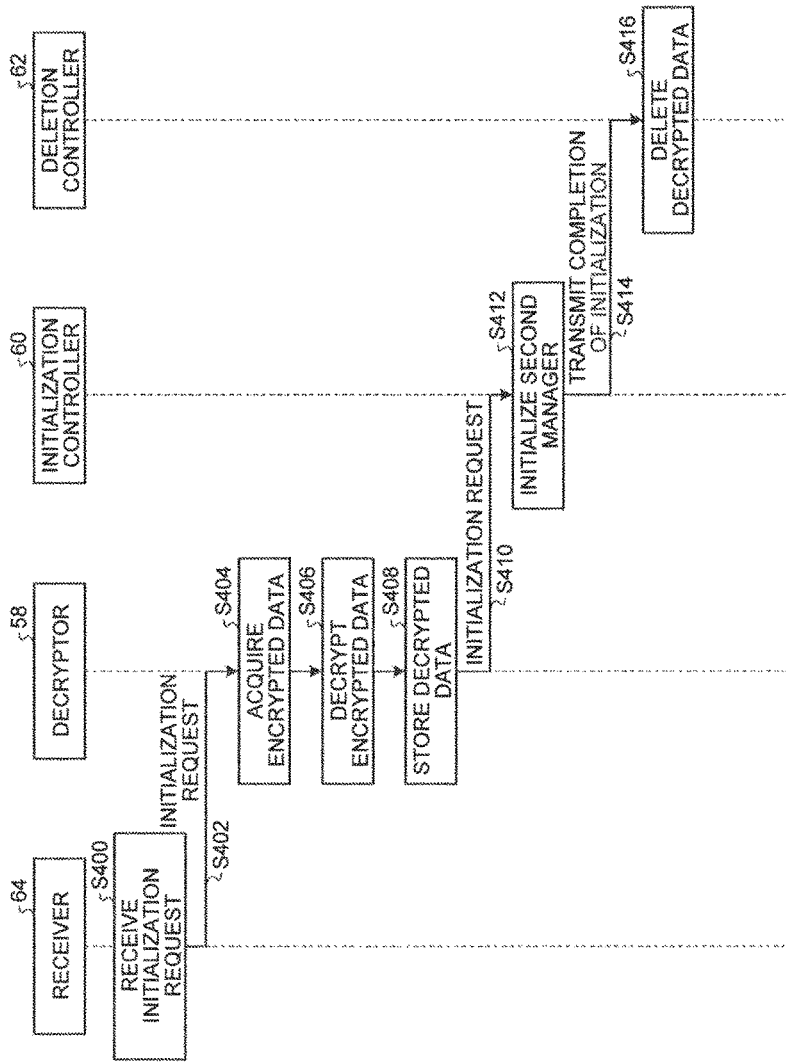
FIG. 21 is a sequence diagram illustrating an example of procedures of an initialization process.

FIG. 21 is a sequence diagram illustrating an example of procedures of an initialization process performed by the controller 12C. The controller 12C performs the initialization process before the first object 18 transmits a request for generating an object.

FIG. 21 illustrates the procedures for initializing the second manager 28.

First, the receiver 64 receives an initialization request from the first object 18 or the like (step S400). Upon receiving the initialization request, the receiver 64 transmits an initialization request to the decryptor 58 (step S402).

The decryptor 58 acquires encrypted data of the second code group from the second storage 56 (step S404). The decryptor 58 then decrypts the encrypted data (step S406). Subsequently, the decryptor 58 stores the second code group that is decrypted data resulting from the decryption into the fourth storage 54 (step S408).

Subsequently, the decryptor 58 transmits an initialization request to the initialization controller 60 (step S410). The initialization controller 60 initializes the second manager 28 by using the second code group that is the decrypted data stored in the fourth storage 54 (step S412). Subsequently, the initialization controller 60 transmits completion of initialization to the deletion controller 62 (step S414).

The deletion controller 62 deletes the second code group that is the decrypted data resulting from the decryption in step S406 from the fourth storage 54 (step S416). The present sequence is then terminated.

As a result of performing the initialization process illustrated in FIG. 21 by the controller 12C, the second manager 28 enters a state capable of using the second code.

After the initialization process is performed, the first object 18 transmits a request for generating an object to the generator 52. The operation procedures performed by the controller 12C when the first object 18 has transmitted a request for generating the second object 22 is the same as those in the first embodiment (refer to FIG. 4).

For example, when the second manager 28 has received a request for loading the second class (refer to step S114 in FIG. 4), the second manager 28 may load the second class (refer to step S116 in FIG. 4) since the second manager 28 is already initialized and has the second class.

As described above, the information processing device 10C of the present embodiment stores encrypted data obtained by encrypting the second code group into the second storage 56. In the process of initializing the second manager 28 by the generator 52, decrypted data resulting from decrypting the encrypted data are then used to perform the process of initializing the second manager 28.

The information processing device 10C of the present embodiment can therefore prevent analysis and falsification of data stored in the second storage 56 in addition to the effects the embodiments described above. The information processing device 10C also stores decrypted data in the fourth storage 54 that cannot be accessed from the first object 18 and debuggers. It is therefore possible to prevent analysis and falsification of the decrypted data from the first object 18 requesting execution.

Fifth Embodiment

In the present embodiment, a case in which a plurality of second objects 22 requested to execute methods are provided and encrypted data of the second code group of each of the second objects 22 are individually stored in a plurality of second storages 56 will be described. Parts that are the same as those in the embodiments described above will be designated by the same reference numerals and description thereof will not be repeated as appropriate.

Figure 22:
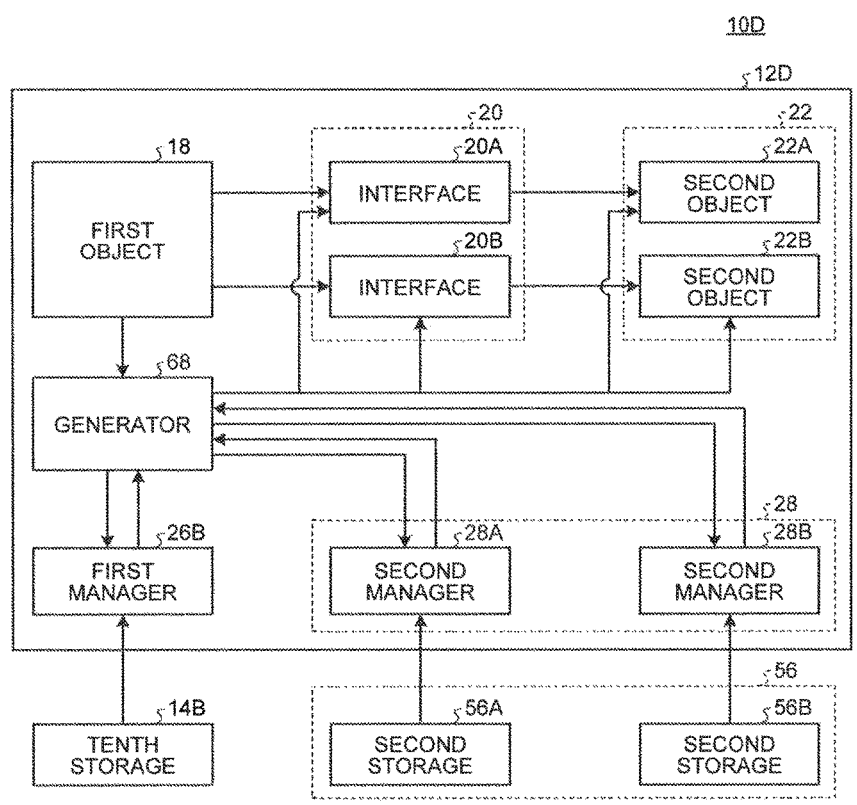
FIG. 22 is a block diagram illustrating an information processing device.

FIG. 22 is a block diagram illustrating an information processing device 10D according to the present embodiment.

The information processing device 10D includes a controller 12D, a tenth storage 14B, and a plurality of second storages 56. The tenth storage 14B is the same as that in the third embodiment.

The controller 12D controls the information processing device 10D. The controller 12D executes programs written in an object-oriented programming language.

The controller 12D includes a first object 18, a plurality of interfaces 20, a plurality of second objects 22, a generator 68, a first manager 26B, and a plurality of second managers 28. The controller 12D implements the first object 18, the interfaces 20, the second objects 22, the generator 68, the first manager 26B, and the second managers 28 by executing programs stored in a ROM, an HDD, or the like. The first object 18 has the same configuration as in the first embodiment.

The controller 12D includes a plurality of second objects 22, a plurality of interfaces 20, a plurality of second managers 28, and a plurality of second storages 56.

Similarly to the third embodiment, the controller 12D includes a second object 22A to a second object 22B as the plurality of second objects 22. Furthermore, similarly to the third embodiment, the controller 12D includes an interface 20A and an interface 20B associated with the second object 22A and the second object 22B as the plurality of interfaces 20. Furthermore, similarly to the third embodiment, the controller 12D includes a second manager 28A and the second manager 28B associated with the second object 22A and the second object 22B as the plurality of second managers 28.

The second object 22A, the second object 22B, the interface 20A, the interface 20B, the second manager 28A, and the second manager 28B are the same as those in the third embodiment.

In the present embodiment, the controller 12D includes a plurality of second storages 56. The second storages 56 are the same as those in the fourth embodiment. In the present embodiment, the controller 12D includes a second storage 56A and a second storage 56B as the plurality of second storages 56. The second storage 56A and the second storage 56B may be collectively referred to as the second storages 56 in the description.

The second storages 56 stores encrypted data of second code groups associated with the respective second objects 22 individually.

More specifically, the second storage 56A stores encrypted data of a second code group describing the second class of the second object 22A. Thus, the second storage 56A stores encrypted data of the second class of the second object 22A. The second storage 56B stores encrypted data of a second code group describing the second class of the second object 22B. Thus, the second storage 56B stores encrypted data of the second class of the second object 22B.

Upon receiving a request for generating any of the second objects 22 (the second object 22A or the second object 22B), the generator 68 generates the second object 22 (the second object 22A or the second object 22B) requested to be generated from the associated second class. Similarly to the generator 40 of the third embodiment, the generator 68 also generates an associated interface 20 (the interface 20A or the interface 20B) from the generated second object 22 (the second object 22A or the second object 22B) and the associated third class (the third class of the interface 20A or the third class of the interface 20B). The generator 68 then transmits the interface 20A or the interface 20B to the first object 18.

Figures 23, 24:
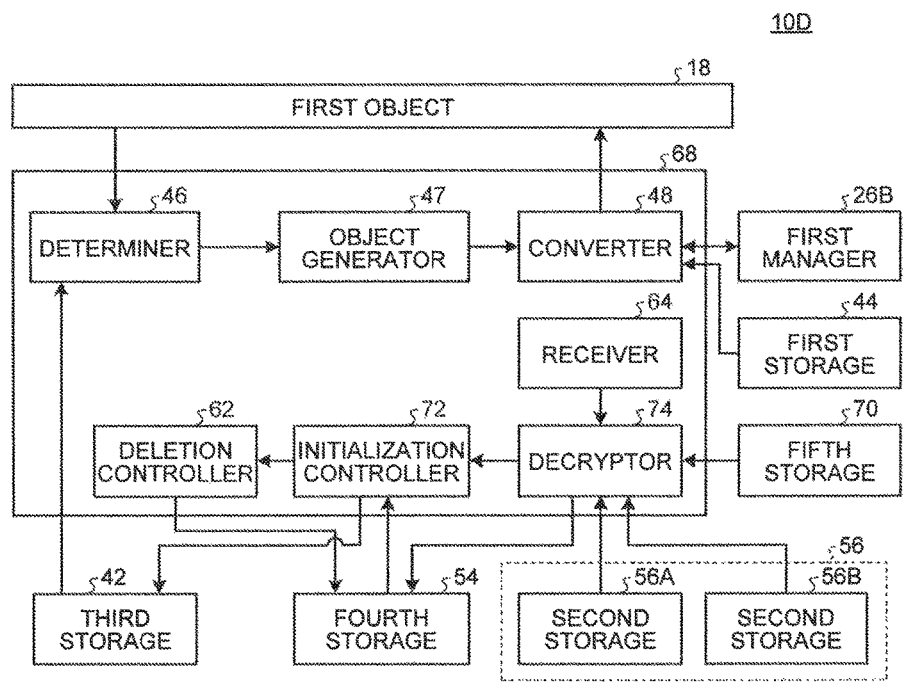
FIG. 23 is an explanatory diagram of a generator.
FIG. 24 is a table illustrating an example of a data structure of a fifth storage.

FIG. 23 is an explanatory diagram of the generator 68. The generator 68 includes a determiner 46, an object generator 47, a converter 48, a deletion controller 62, an initialization controller 72, a receiver 64, and a decryptor 74. The determiner 46, the object generator 47, and the converter 48 are the same as those in the third embodiment. The deletion controller 62 and the receiver 64 are the same as those in the fourth embodiment.

As illustrated in FIG. 23, the information processing device 10D includes a first storage 44, a fourth storage 54, a third storage 42, the second storages 56, and a fifth storage 70. The first storage 44 and the third storage 42 are the same as those in the third embodiment. The fourth storage 54 and the second storages 56 are the same as those in the fourth embodiment.

The fifth storage 70 stores third identification information identifying each of the second storages 56 and a decryption key for encrypted data stored in each of the second storages 56 in association with each other.

The decryption keys stored in the first storage 70 may be different decryption keys depending on the associated third identification information or may be the same decryption keys.

FIG. 24 is a diagram illustrating an example of the data structure of the fifth storage 70. As illustrated in FIG. 24, the fifth storage 70 stores the third identification information (refer to THIRD ID in the drawing) that is identification information (ID) of a second storage 56 and a decryption key in association with each other.

The description refers back to FIG. 23, in which the decryptor 74 reads encrypted data from each of the second storages 56. The decryptor 74 also acquires the decryption key associated with the third identification information of each of the second storages 56 from the fifth storage 70. The decryptor 74 then uses the read decryption key to decrypt the encrypted data stored in the associated second storage 56. The decryptor 74 then stores decrypted data in the fourth storage 54.

Upon receiving an initialization request, the initialization controller 72 initializes the associated second manager 28 by using the second code group that is decrypted data stored in the fourth storage 54. More specifically, the second initialization controller 72 initializes the second manager 28A by using the second code group obtained by decrypting the encrypted data stored in the second storage 56A. The second initialization controller 72 also initializes the second manager 28B by using the second code group obtained by decrypting the encrypted data stored in the second storage 56B.

Figure 25:
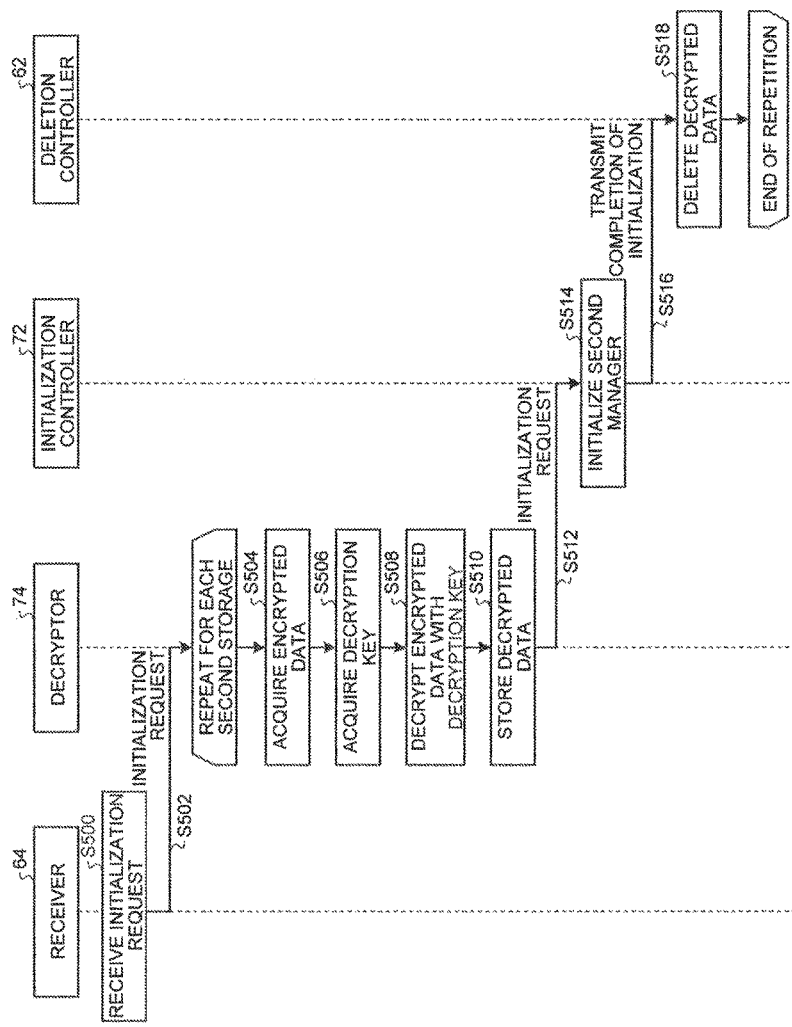
FIG. 25 is a sequence diagram illustrating an example of procedures of an initialization process.

FIG. 25 is a sequence diagram illustrating an example of procedures of an initialization process performed by the controller 12D. The controller 12D performs the initialization process before the first object 18 transmits a request for generating an object. Thus, the first object 18 transmits a request for initializing the second manager 28 associated with the second object 22 requested to be generated to the generator 68 before transmitting a request for generating the object to the generator 68.

FIG. 25 illustrates procedures for initializing all of the second managers 28 (the second manager 28A and the second manager 28B).

First, the receiver 64 receives a request for initializing a second manager 28 (step S500). The receiver 64 transmits an initialization request to the decryptor 74 (step S502).

Subsequently, the generator 68 repeats processing in steps S504 to S518 for each of the second storages 56 provided in the information processing device 10D.

More specifically, the decryptor 74 first acquires encrypted data stored in the second storage 56 associated with the second manager 28 that is not being subjected to initialization of the plurality of second storages 56 (step S504). Subsequently, the decryptor 74 acquires the decryption key associated with the third identification information of the second storage 56 from which the encrypted data are acquired in step S504 from the fifth storage 70 (step S506).

Subsequently, the decryptor 74 decrypts the encrypted data acquired in step S504 by using the decryption key acquired in step S506 (step S508). Subsequently, the decryptor 74 stores the second code group that is decrypted data resulting from the decryption into the fourth storage 54 (step S510).

Subsequently, the decryptor 74 transmits a request for initializing the second manager 28 associated with the second code group that is the decrypted data of the plurality of second managers 28 to the initialization controller 72 (step S512). Upon receiving the initialization request, the initialization controller 72 initializes the associated second manager 28 (the second manager 28A, for example) by using the second code group that is the decrypted data stored in the initialization controller 72 (step S514).

Subsequently, the initialization controller 72 transmits completion of initialization to the deletion controller 62 (step S516). The deletion controller 62 deletes the decrypted data from the fourth storage 54 (step S518). The repetition is then terminated.

As a result of performing the initialization process illustrated in FIG. 25 by the controller 12D, the second managers 28 are initialized.

After the initialization process is performed, the first object 18 transmits a request for generating an object to the generator 68. The operation procedures performed by the controller 12D when the first object 18 has transmitted a request for generating the second object 22 is the same as those in the third embodiment (refer to FIG. 18).

For example, when the second manager 28A or the second manager 28B has received a request for loading the second class (refer to step S312 in FIG. 18), the second manager 28A or the second manager 28B may load the second class (refer to step S314 in FIG. 18) since the second manager 28A or the second manager 28B is already initialized and has the second class.

As described above, the information processing device 10D of the present embodiment stores encrypted data obtained by encrypting the second code group associated with each of the second objects 22 individually into each of the second storages 56. Furthermore, the fifth storage 70 stores the third identification information of a second storage 56 and a decryption key in association with each other. In the process of initializing the second managers 28 (the second manager 28A, the second manager 28B) by the generator 68, the decryptor 74 decrypts encrypted data stored in the respective second managers 28 by using decryption keys associated with the third identification information. The initialization controller 72 then performs the process of initializing the second managers 28 by using the decrypted data.

As described above, in the present embodiment, the fifth storage 70 stores decryption keys for encrypted data stored in the respective second storages 56. It is therefore possible to prevent analysis and falsification of data stored in the respective second storages 56 similarly to the case in which the information processing device 10D includes one second storage 56. Furthermore, it is possible to limit access from the first object 18 to the respective first managers 26.

The information processing device 10D also stores decrypted data in the fourth storage 54 that cannot be accessed from the first object 18 and debuggers. It is therefore possible to prevent analysis and falsification of the decrypted data from the first object 18 requesting execution.

In the present embodiment, as described with reference to FIG. 25, the deletion controller 62 deletes the second code group that is the decrypted data from the fourth storage 54 after completion of the initialization process performed by the initialization controller 72. It is therefore possible to further reduce the possibility of analysis or falsification of the decrypted data stored in the fourth storage 54 by the first object 18, debuggers, or the like. If the protecting function of the fourth storage 54 against the first object 18 or debuggers is robust, the deleting process of step S518 performed by the deletion controller 62 may be omitted.

Sixth Embodiment

In the first embodiment, the process of initializing the second manager 28 is performed before the first object 18 transmits a request for generating an object. In the present embodiment, a process of initializing an uninitialized second manager 28 is performed after the first object 18 transmits a request for generating an object. Parts that are the same as those in the embodiments described above will be designated by the same reference numerals and description thereof will not be repeated as appropriate.

Figure 26:
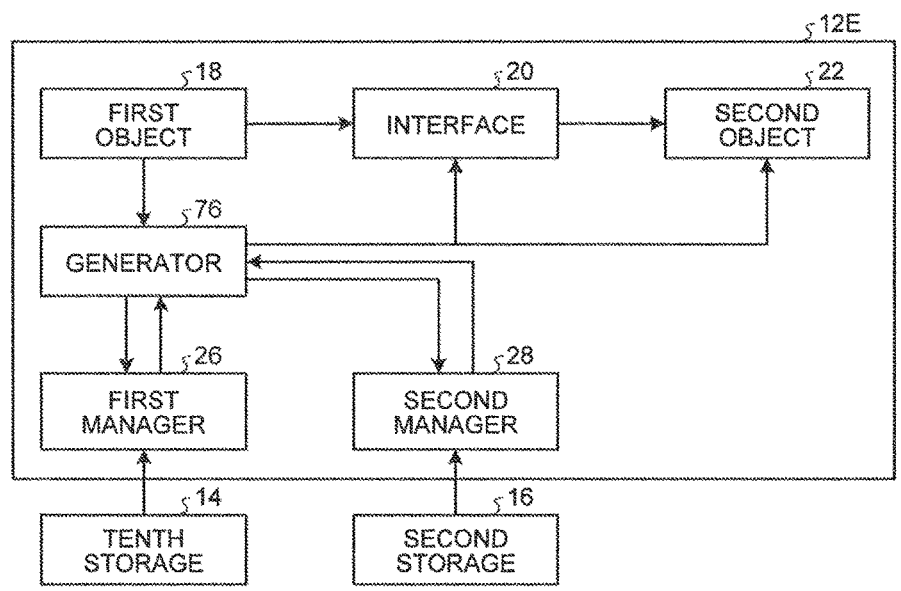
FIG. 26 is a block diagram illustrating an information processing device.

FIG. 26 is a block diagram illustrating an information processing device 10E according to the present embodiment. The information processing device 10E includes a controller 12E, a tenth storage 14, and a second storage 16.

The controller 12E controls the information processing device 10E. The controller 12E executes programs written in an object-oriented programming language.

The controller 12E includes a first object 18, an interface 20, a second object 22, a generator 76, a first manager 26, and a second manager 28. The controller 12E implements the first object 18, the interface 20, the second object 22, the generator 76, the first manager 26, and the second manager 28 by executing programs stored in a ROM, an HDD, or the like.

The tenth storage 14 and the second storage 16 are the same as those in the first embodiment. The first object 18, the interface 20, the second object 22, the first manager 26, and the second manager 28 are also the same as those in the first embodiment.

The generator 76 initializes an uninitialized second manager 28 after receiving a request for generating the second object 22. The generator 76 also generates the second object 22 from the second class similarly to the first embodiment. The generator 76 also generates the interface 20 from the second object 22 and the third class. The generator 76 then transmits the interface 20 to the first object 18.

Figure 27:
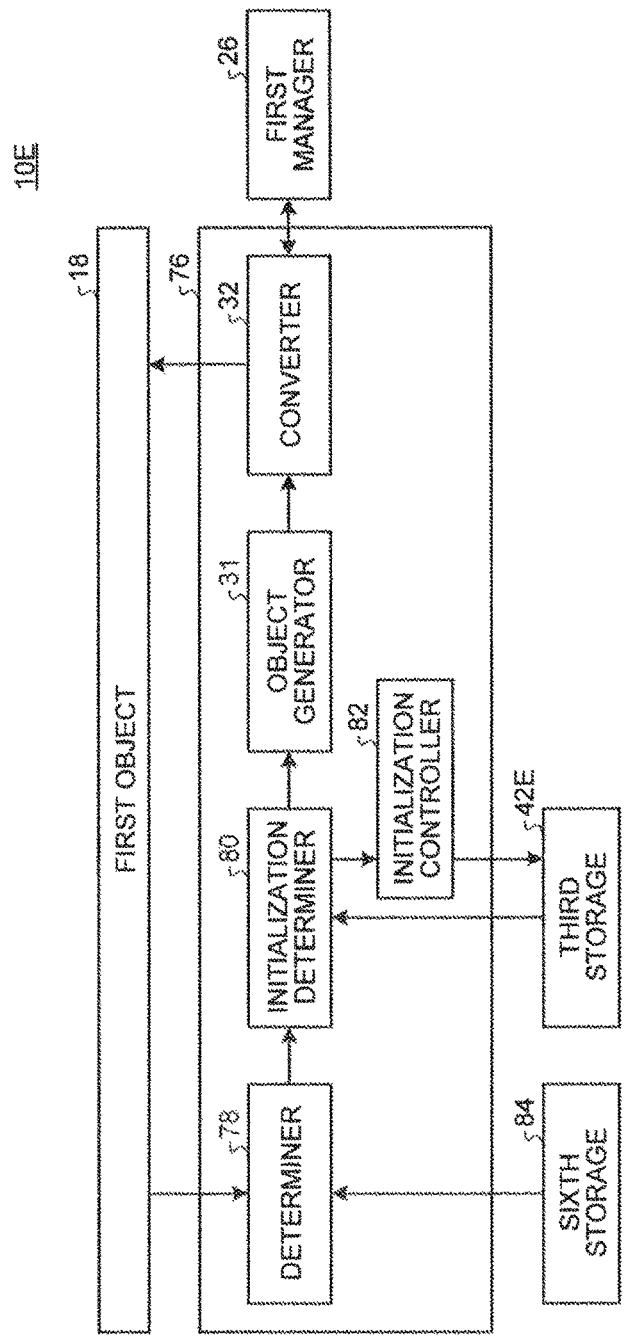
FIG. 27 is an explanatory diagram of a generator.

FIG. 27 is an explanatory diagram of the generator 76. The generator 76 includes a determiner 78, an initialization determiner 80, an object generator 31, a converter 32, and an initialization controller 82. The object generator 31 and the converter 32 are the same as those in the first embodiment. The information processing device 10E also includes a first manager 26, a sixth storage 84, and a third storage 42E. The first manager 26 is the same as that in the first embodiment.

Figure 28:
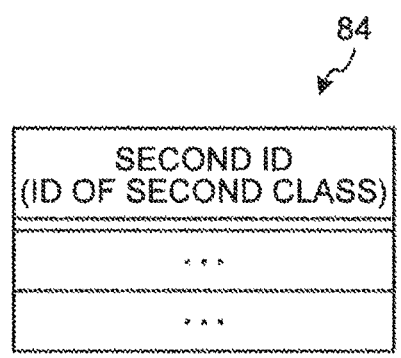
FIG. 28 is a table illustrating an example of a data structure of a sixth storage.

The sixth storage 84 stores second identification information of the second class to be loaded by the second manager 28. FIG. 28 is a diagram illustrating an example of the data structure of the sixth storage 84. As illustrated in FIG. 28, the sixth storage 84 stores second identification information (refer to SECOND ID in FIG. 28) that is identification information (ID) of a second class.

For example, assume that the number of the second objects 22 requested to be generated by the second storage 16 is more than one. Also assume that the second manager 28 loads each of the second classes of the respective second objects 22. In this case, the sixth storage 84 stores the second identification information identifying each of the second classes of the respective second objects 22. Specifically, when the second storage 16 stores two pieces of second identification information, this means that the second manager 28 loads the second classes identified by the two pieces of second identification information but does not load classes other than these second classes.

The third storage 42E stores initialization information or non-initialization information. The initialization information indicates that the second manager 28 is initialized. The non-initialization information indicates that the second manager 28 is uninitialized.

Figure 29:
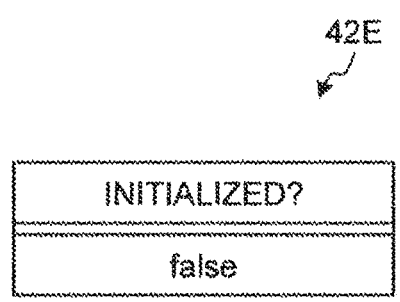
FIG. 29 is a table illustrating an example of a data structure of a third storage.

FIG. 29 is a diagram illustrating an example of the data structure of the third storage 42E. As illustrated in FIG. 29, if the second manager 28 is not initialized, for example, the third storage 42E stores "false", for example, as the non-initialization information. In contrast, if the second manager 28 is initialized, the third storage 42E stores "true", for example, as the initialization information.

The description refers back to FIG. 27, in which the determiner 78 receives a request for generating an object from the first object 18. The determiner 78 determines whether or not the second manager 28 can load the class of the object requested to be generated. Specifically, the determiner 78 determines whether or not the class of the object requested to be generated is loadable from the second manager 28 by determining whether or not the identification information of the class is stored in the sixth storage 84.

The initialization determiner 80 determines whether or not the second manager 28 is initialized. The initialization determiner 80 determines whether or not the second manager 28 is initialized by determining whether or not the initialization information is stored in the third storage 42E.

If the second manager 28 is determined to be uninitialized, the initialization determiner 80 transmits a request for initializing the second manager 28 to the initialization controller 82.

Upon receiving the initialization request from the initialization determiner 80, the initialization controller 82 initializes the second manager 28 by using the second code group stored in the second storage 16. After initializing the second manager 28, the initialization controller 82 changes the non-initialization information stored in the third storage 42E to initialization information.

Figure 30:
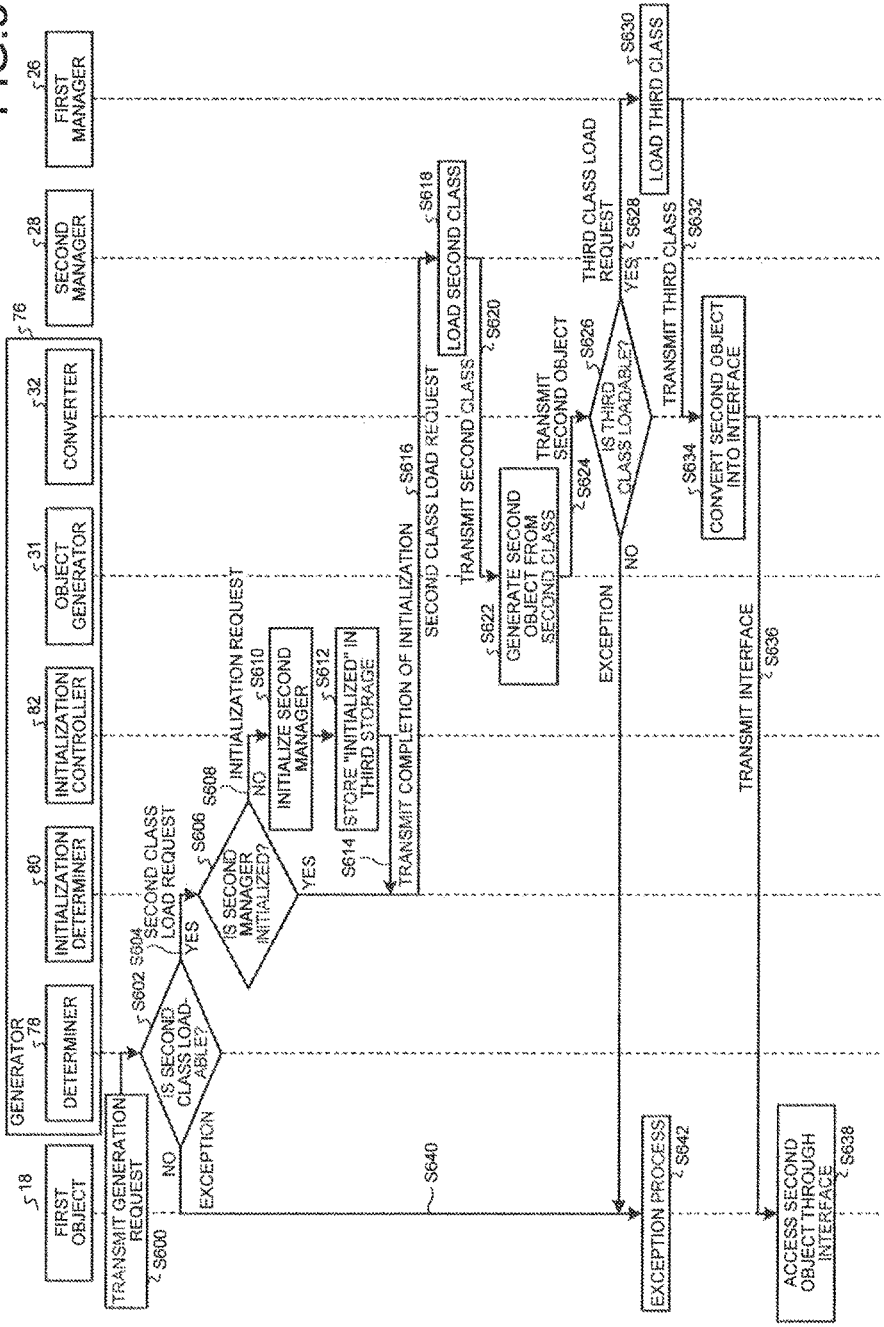
FIG. 30 is a sequence diagram illustrating an example of operation procedures of a controller.

FIG. 30 is a sequence diagram illustrating an example of operation procedures of the controller 12E when the first object 18 has transmitted a request for generating another object. Note that a case in which the first object 18 transmits a request for generating the second object 22 will be described as a specific example.

First, the first object 18 transmits a request for generating the second object 22 to the generator 76 (step S600). Upon receiving the generation request from the first object 18, the determiner 78 in the generator 76 determines whether or not the second class is loadable (step S602). The generator 76 performs the determination in step S602 by determining whether or not the second identification information of the second class is stored in the sixth storage 84.

Specifically, if the second identification information of the second class is determined to be stored in the sixth storage 84 (step S602: Yes), the generator 76 transmits a request for loading the second class to the initialization determiner 80 (step S604).

Subsequently, the initialization determiner 80 determines whether or not the second manager 28 is initialized by using the third storage 42E (step S606). If the second manager 28 is determined to be uninitialized (step S606: No), the initialization determiner 80 transmits a request for initializing the second manager 28 to the initialization controller 82 (step S608).

Figure 31:
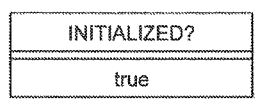
FIG. 31 is a diagram illustrating a third storage.

Upon receiving the request for initializing the second manager 28, the initialization controller 82 initializes the second manager 28 by using the second code group stored in the second storage 16 (step S610). Subsequently, the initialization controller 82 stores initialization information indicating that the second manager 28 is initialized into the third storage 42E (step S612). FIG. 31 is a diagram illustrating the third storage 42E storing "true" that is the initialization information.

The description refers back to FIG. 30, in which the initialization controller 82 transmits completion of initialization to the initialization determiner 80 (step S614). Subsequently, the process proceeds to step S616.

If the second manager 28 is determined to be initialized in the determination of step S606 (step S606: Yes), the process proceeds to step S616 without performing the processing in steps S610 to S612.

In step S616, the initialization determiner 80 transmits a request for loading the second class to the second manager 28 (step S616).

Subsequently, the controller 12E performs processing in steps S618 to S642 similarly to steps S116 to S140 in the first embodiment.

As described above, in the information processing device 10E of the present embodiment, the generator 76 in receipt of a request for generating the second object 22 from the first object 18 determines whether or not the second manager 28 is initialized, and initializes the second manager 28 if the second manager 28 is determined to be uninitialized. Generation of the second object 22 and generation of the interface 20 are then performed after the initialization.

The information processing device 10E of the present embodiment thus delays the process of initializing the second manager 28 until immediately before generation of the second object 22 as compared to the first embodiment. As a result, the memory usage can be reduced until immediately before the generation of the second object 22 in addition to the effects of the embodiments described above. This is because a memory for loading second data stored in the second storage 16 is needed after initialization of the second manager 28, but the information processing device 10E need not consume the memory until the initialization is performed by delaying the initialization process.

For example, assume that there is an object required to be generated only when some abnormality or an exception process is caused. In this case, a group of data relating to the object need not be loaded into a memory until such abnormality or an exception process is caused. The memory usage can therefore be reduced.

Note that the second code group may be stored in a form of encrypted data in the second storage 16 similarly to the fourth embodiment. In this case, the information processing device 10E of the present embodiment may further include the receiver 64, the decryptor 58, the deletion controller 62, and the fourth storage 54 as described in the fourth embodiment (refer to FIG. 20).

Furthermore, the initialization controller 82 may perform the process of initializing the second manager 28 immediately before generation of the second object 22. As a result, various analysis and falsification can further be prevented in addition to the effects described above.

For example, the second storage 16 stores the second code group of the second object 22 generated only when billing is required. In this case, since a billing process is contained in the second code group, retention of the second code group in plaintext should be avoided as much as possible. The second code group is thus stored in a form of encrypted data in the second storage 16 similarly to the fourth embodiment.

As a result, the second code group can be protected in an encrypted form until immediately before performing the billing process and the second object 22 need not be developed in plaintext on a memory. Various analysis and falsification can therefore be prevented.

Seventh Embodiment

In the present embodiment, a process of initializing an uninitialized second manager 28 is performed after the first object 18 transmits a request for generating an object. Furthermore, in the present embodiment, a case in which the number of second managers 28 to be initialized is more than one will be described. Parts that are the same as those in the embodiments described above will be designated by the same reference numerals and description thereof will not be repeated as appropriate.

Figure 32:
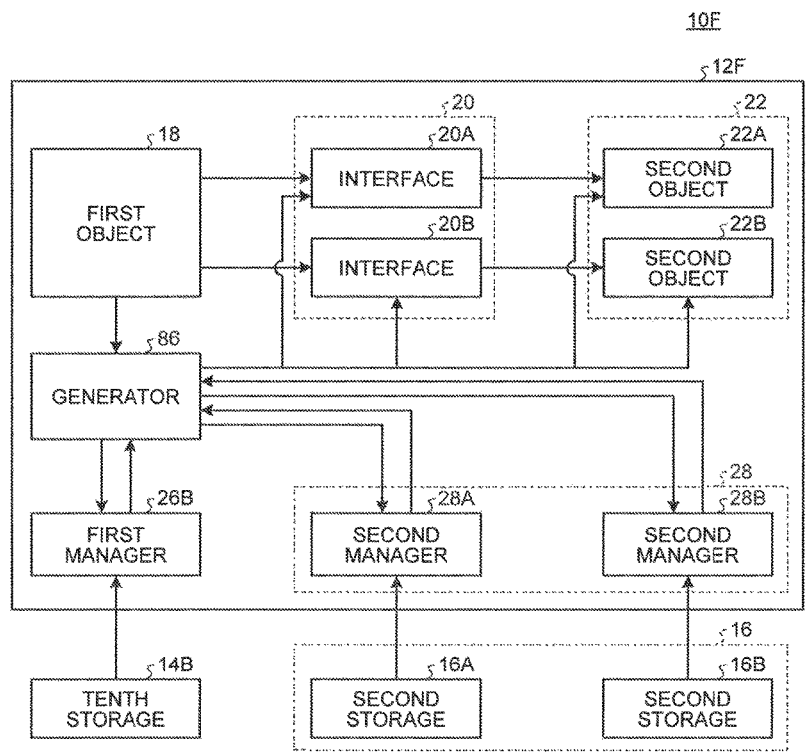
FIG. 32 is a block diagram illustrating an information processing device.

FIG. 32 is a block diagram illustrating an information processing device 10F according to the present embodiment.

The information processing device 10F includes a controller 12F, a tenth storage 14B, and a plurality of second storages 16.

The controller 12F controls the information processing device 10F. The controller 12F executes programs written in an object-oriented programming language.

The controller 12F includes a first object 18, a plurality of interfaces 20, a plurality of second objects 22, a generator 86, a first manager 26B, and a plurality of second managers 28. The controller 12F implements the first object 18, the interfaces 20, the second objects 22, the generator 86, the first manager 26B, and the second managers 28 by executing programs stored in a ROM, an HDD, or the like.

The tenth storage 14B, the second storages 16 (the second storage 16A, the second storage 16B), and the first manager 26B are the same as those in the third embodiment. The first object 18 is the same as that in the first embodiment.

Similarly to the third embodiment, the controller 12F includes a second object 22A to a second object 22B as the plurality of second objects 22. Furthermore, similarly to the third embodiment, the controller 12F includes an interface 20A and an interface 20B associated with the second object 22A and the second object 22B as the plurality of interfaces 20. Furthermore, similarly to the third embodiment, the controller 12F includes a second manager 28A and the second manager 28B associated with the second object 22A and the second object 22B as the plurality of second managers 28. In the present embodiment, the controller 12F includes the second storage 16A and the second storage 16B as the plurality of second storages 16 similarly to the third embodiment.

The second object 22A, the second object 22B, the interface 20A, the interface 20B, the second manager 28A, the second manager 28B, the second storage 16A, and the second storage 16B are the same as those in the third embodiment.

The generator 86 initializes an uninitialized second manager 28 after receiving a request for generating the second object 22. The generator 86 also generates the second object 22 (the second object 22A or the second object 22B) from the second class similarly to the third embodiment. The generator 86 also generates the interface 20 (the interface 20A or the interface 20B) from the generated second object 22 (the second object 22A or the second object 22B) and the third class. The generator 86 then transmits the generated interface 20 (the interface 20A or the interface 20B) to the first object 18.

Figure 33:
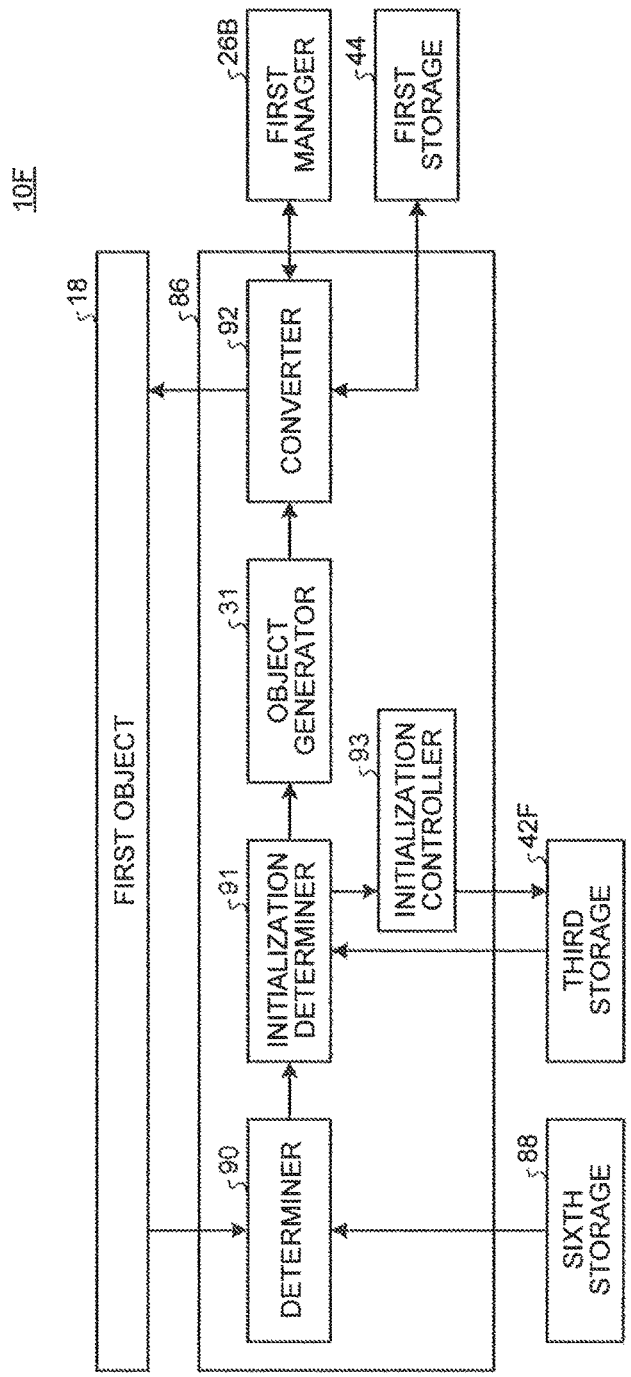
FIG. 33 is an explanatory diagram of a generator.

FIG. 33 is an explanatory diagram of the generator 86. The generator 86 includes a determiner 90, an initialization determiner 91, an object generator 31, a converter 92, and an initialization controller 93. The object generator 31 is the same as that in the first embodiment. The information processing device 10F also includes a sixth storage 88, a first storage 44, and a third storage 42F. The first storage 44 is the same as that in the third embodiment.

Figure 34:
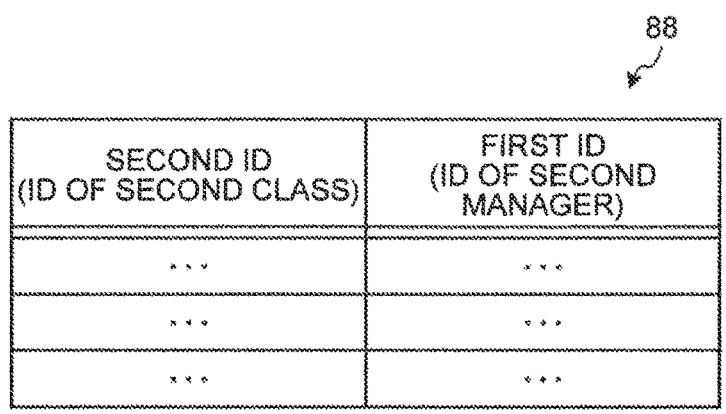
FIG. 34 is a table illustrating an example of a data structure of a sixth storage.

The sixth storage 88 stores second identification information of a second class and first identification information of the second manager 28 that loads the second class identified by the second identification information in association with each other. FIG. 34 is a diagram illustrating an example of the data structure of the sixth storage 88. As illustrated in FIG. 34, the sixth storage 88 stores second identification information (refer to SECOND ID in FIG. 34) that is identification information (ID) of a second class and first identification information (refer to FIRST ID in FIG. 34) that is identification information (ID) of the second manager 28 that loads the second class identified by the second identification information in association with each other.

The third storage 42F stores the first identification information that is identification information (ID) of a second manager 28 and information indicating whether or not the second manager 28 identified by the first identification information is initialized in association with each other. The third storage 42F stores initialization information or non-initialization information as the information indicating whether or not a second manager 28 is initialized similarly to the third embodiment.

Figure 35:
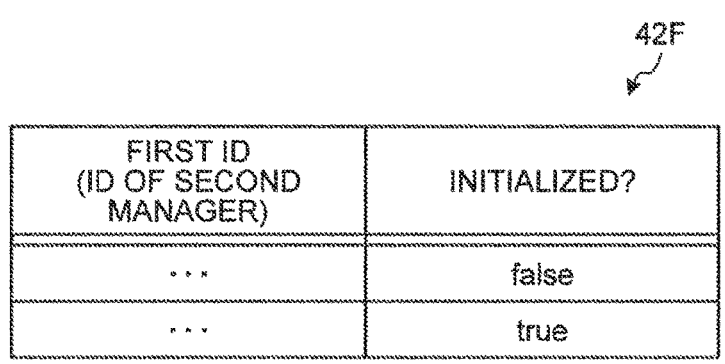
FIG. 35 is a table illustrating an example of a data structure of a third storage.

FIG. 35 is a diagram illustrating an example of the data structure of the third storage 42F. As illustrated in FIG. 35, the third storage 42F stores the first identification information (refer to FIRST ID in FIG. 35) and the initialization information or the non-initialization information in association with each other. As illustrated in FIG. 35, if the second manager 28 identified by the first identification information is not initialized, for example, the third storage 42F stores "false", for example, as the non-initialization information. In contrast, if the second manager 28 identified by the first identification information is initialized, the third storage 42F stores "true", for example, as the initialization information.

The description refers back to FIG. 33, in which the determiner 90 receives a request for generating an object from the first object 18. The determiner 90 determines whether or not the class of the object requested to be generated can be loaded from the second manager 28.

For example, the determiner 90 receives a request for generating the second object 22 from the first object 18. The determiner 90 determines whether or not the second class of the second object 22 can be loaded from any of the plurality of second managers 28.

More specifically, the determiner 90 first determines whether or not there is a second manager 28 that loads the second class of the second objects 22 (the second object 22A or the second object 22B) requested to be generated of the plurality of second managers 28. Specifically, the determiner 90 determines whether or not the second identification information of the second class of the second object 22 requested to be generated and the first identification information of the second manager 28 associated with the second identification information are stored in the sixth storage 88 in association with each other. If the second identification information and the first identification information are stored in the sixth storage 88 in association with each other, the determiner 90 determines that the second class of the second object 22 requested to be generated is loadable.

The initialization determiner 91 determines whether or not the second manager 28 on which the determination is made by the determiner 90 of the plurality of second managers 28 is initialized. If the second manager 28 that loads the second class of the second object 22 requested to be generated is uninitialized, the initialization determiner 91 transmits a request for initializing the second manager 28 to the initialization controller 93.

Upon receiving the initialization request from the initialization determiner 91, the initialization controller 93 initializes the second manager 28 by using a second code group stored in the second storage 16 (the second storage 16A or the second storage 16B) associated with the second manager 28 to be initialized of the plurality of second storages 16. After initializing the second manager 28, the initialization controller 93 then changes the non-initialization information stored in the third storage 42F to initialization information.

Figure 36:
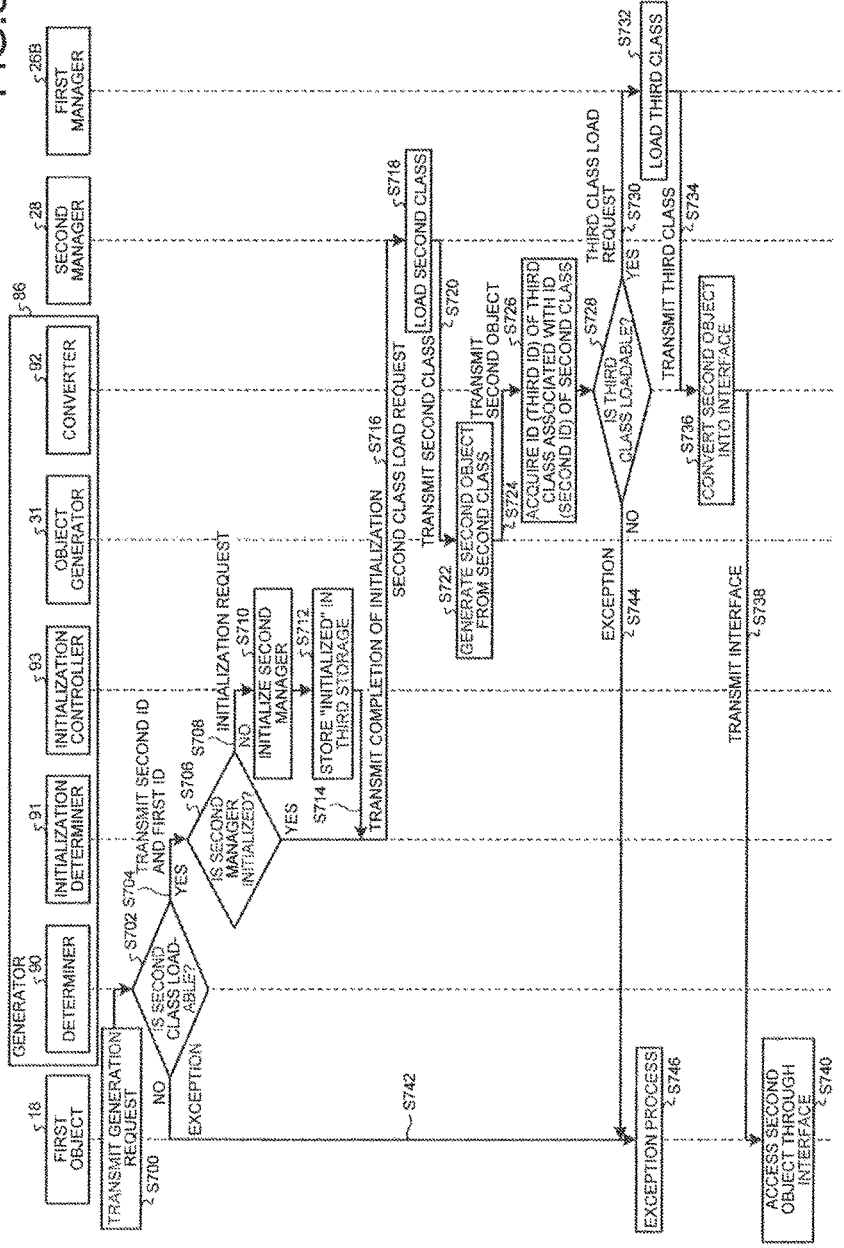
FIG. 36 is a sequence diagram illustrating an example of operation procedures of a controller.

FIG. 36 is a sequence diagram illustrating an example of operation procedures of the controller 12F when the first object 18 has transmitted a request for generating another object. Note that a case in which the first object 18 transmits a request for generating the second object 22B will be described as a specific example.

First, the first object 18 transmits a request for generating the second object 22B to the generator 86 (step S700). Upon receiving the generation request from the first object 18, the determiner 90 in the generator 86 determines whether or not the second class of the second object 22B requested to be generated is loadable from any of the second managers 28 (the second manager 28A or the second manager 28B) on the basis of the sixth storage 88 (step S702).

If the determiner 90 determines that the second class is loadable (step S702: Yes), the determiner 90 transmits the second identification information of the second class of the second object 22B requested to be generated and the first identification information (identification of the second manager 28) associated with the second identification information in the sixth storage 88 to the initialization determiner 91 (step S704).

The initialization determiner 91 determines whether or not the second manager 28B identified by the first identification information received from the determiner 90 is initialized (step S706). In step S706, the initialization determiner 91 determines whether or not initialization information is stored in the sixth storage 88 in association with the first identification information of the second manager 28B.

Subsequently, if the second manager 28B is determined to be uninitialized (step S706: No), the initialization determiner 91 transmits a request for initializing the second manager 28B to the initialization controller 93 (step S708).

Upon receiving the request for initializing the second manager 28B, the initialization controller 93 initializes the second manager 28B by using the second code group stored in the second storage 16B (step S710). Subsequently, the initialization controller 93 stores initialization information indicating that the second manager 28B is initialized into the third storage 42F (step S712). For example, the initialization controller 93 stores "true" that is the initialization information in association with the first identification information of the second manager 28B into the third storage 42F.

The initialization controller 93 transmits completion of initialization to the initialization determiner 91 (step S714). Subsequently, the process proceeds to step S716.

If the second manager 28B is determined to be initialized in the determination of step S706 (step S706: Yes), the process proceeds to step S716 without performing the processing in steps S710 to S712.

In step S716, the initialization determiner 91 transmits a request for loading the second class of the second object 22B to the second manager 28 of the plurality of second managers 28 (step S716).

Subsequently, the second manager 28B loads the second class from the second storage 16B (step S718). The second manager 28B then transmits the loaded second class to the generator 86 (step S720).

Upon receiving the second class, the object generator 31 of the generator 86 generates the second object 22B from the second class (step S722). Subsequently, the object generator 31 transmits the second object 22B to the converter 92 (step S724).

The converter 92 acquires third identification information that is identification information of the third class of the interface 20B associated with the second identification information that is identification information of the second class of the second object 22B from the first storage 44 (step S726; refer to FIG. 16).

Subsequently, the converter 92 determines whether or not the third class identified by the third identification information acquired in step S726 is loadable from the first manager 26B (step S728). Subsequently, the controller 12F performs processing in steps S730 to S746 similarly to steps S125 to S140 in the first embodiment.

As described above, in the information processing device 10F of the present embodiment, upon receiving a request for generating any of the plurality of second objects 22 from the first object 18, the generator 86 determines whether or not the second manager 28 that loads the second class of the second object 22 requested to be generated of the plurality of second managers 28 is initialized. If the second manager 28 is determined to be uninitialized, the second manager 28 is subjected to initialization.

The information processing device 10F of the present embodiment thus delays the process of initializing the second manager 28 associated with the second object 22 requested to be generated until immediately before generation of the second object 22. As a result, the memory usage can be reduced until immediately before the generation of the second object 22 in addition to the effects of the embodiments described above. This is because a memory for developing second data stored in the second storage 16 is needed after initialization of the second manager 28, but the information processing device 10F need not consume the memory for developing the data until the initialization is performed by delaying the initialization process.

Eighth Embodiment

In the eighth embodiment, a case in which the second manager 28 is updated will be described. Parts that are the same as those in the embodiments described above will be designated by the same reference numerals and description thereof will not be repeated as appropriate.

Figure 37:
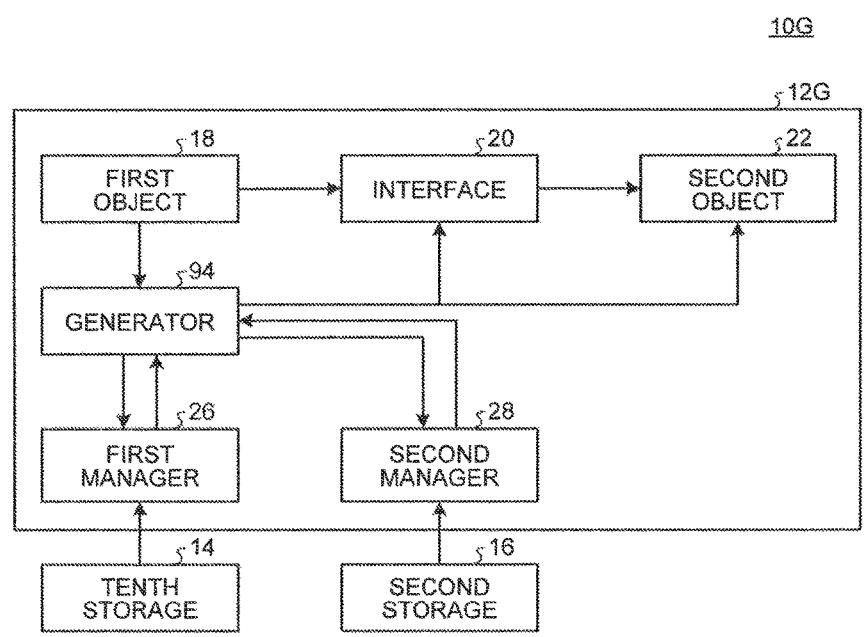
FIG. 37 is a block diagram illustrating an information processing device.

FIG. 37 is a block diagram illustrating an information processing device 10G according to the present embodiment.

The information processing device 10G includes a controller 12G, a tenth storage 14, and a second storage 16.

The controller 12G controls the information processing device 10G. The controller 12G executes programs written in an object-oriented programming language.

The controller 12G includes a first object 18, an interface 20, a second object 22, a generator 94, a first manager 26, and a second manager 28. The controller 12G implements the first object 18, the interface 20, the second object 22, the generator 94, the first manager 26, and the second manager 28 by executing programs stored in a ROM, an HDD, or the like.

The tenth storage 14 and the second storage 16 are the same as those in the first embodiment. The first object 18, the interface 20, the second object 22, the first manager 26, and the second manager 28 are also the same as those in the first embodiment.

Upon receiving a request for generating the second object 22, the generator 94 generates the second object 22 from the second class. The generator 94 also generates the interface 20 from the second object 22 and the third class. The generator 94 then transmits the interface 20 to the first object 18.

Figure 38:
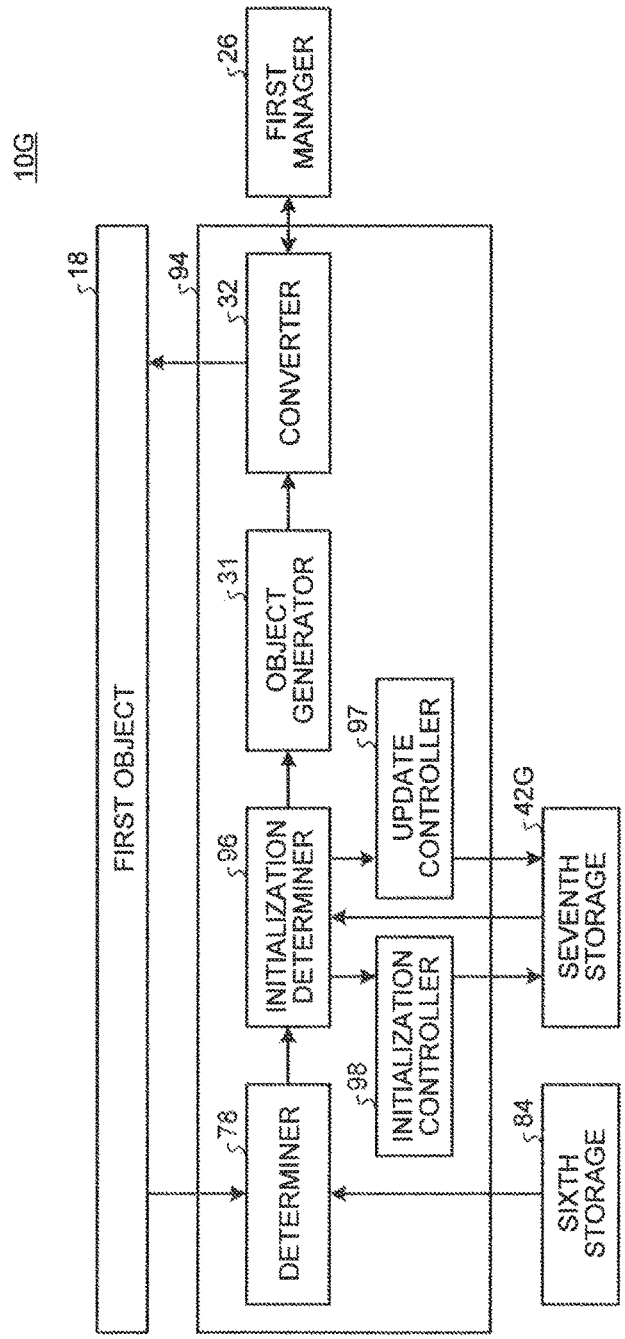
FIG. 38 is an explanatory diagram of a generator.

FIG. 38 is an explanatory diagram of the generator 94. The generator 94 includes a determiner 78, an initialization determiner 96, an object generator 31, a converter 32, an initialization controller 98, and an update controller 97. The object generator 31 and the converter 32 are the same as those in the first embodiment. The determiner 78 is the same as that in the sixth embodiment.

The information processing device 10G also includes a sixth storage 84, and a seventh storage 42G. The sixth storage 84 is the same as that in the sixth embodiment.

The seventh storage 42G stores the first identification information (first ID) that is identification information (ID) of a second manager 28, information indicating whether or not the second manager 28 identified by the first identification information is initialized, and a hash value in association with one another. The information indicating whether or not the second manager 28 is initialized is either initialization information indicating that the second manager 28 is initialized or non-initialization information indicating that the second manager 28 is uninitialized. The hash value is a hash value in the second code group stored in the second storage 16 associated with the second manager 28 identified by the associated first identification information.

FIGS. 39A and 39B are tables illustrating an example of the data structure of the seventh storage 42G. As illustrated in FIGS. 39A and 39B, the seventh storage 42G stores the first identification information (refer to FIRST ID in FIGS. 39A and 39B), the information indicating whether or not initialization is completed, and a hash value in association with one another. FIG. 39A illustrates a state in which "false" that is the non-initialization information is stored. FIG. 39B illustrates a state in which "true" that is the initialization information is stored. FIG. 39B also illustrates that the hash value of the second code group stored in the second storage 16 associated with the second manager 28 is "Hash(A)".

The description refers back to FIG. 38 in which the initialization determiner 96 determines whether or not the second manager 28 is initialized by using the seventh storage 42G. If the second manager 28 is determined to be uninitialized, the initialization determiner 96 transmits a request for initializing the second manager 28 to the initialization controller 98.

If the second manager 28 is determined to be initialized, the initialization determiner 96 determines whether or not the second storage 16 associated with the second manager 28 is the latest by using the seventh storage 42G.

More specifically, upon receiving the request for generating the second object 22, the initialization determiner 96 calculates a hash value from the second code group stored in the second storage 16. The initialization determiner 96 also reads the hash value associated with the first identification information of the second manager 28 on which determination is made whether or not initialization is completed stored in the seventh storage 42G. The initialization determiner 96 then determines that the second manager 28 is not the latest if the calculated hash value is not equal to the hash value read from the seventh storage 42G If the second manager 28 is not the latest, the initialization determiner 96 transmits a request for updating the second manager 28 to the update controller 97.

The initialization controller 98 initializes the second manager 28 by using the second code group stored in the second storage 16. After initializing the second manager 28, the initialization controller 98 changes the information indicating whether or not initialization is completed in the seventh storage 42G to initialization information. For example, the initialization controller 98 changes "false" that is non-initialization information associated with the first identification information of the second manager 28 in the seventh storage 42G to "true" that is initialization information. Furthermore, the second manager 28 calculates the hash value of the second code group in the second storage 16 used for the initialization into the seventh storage 42G in association with the initialization information.

FIG. 40 is a sequence diagram illustrating an example of operation procedures of the controller 12G when the first object 18 has transmitted a request for generating another object. Note that a case in which the first object 18 transmits a request for generating the second object 22 will be described as a specific example.

First, the first object 18 transmits a request for generating the second object 22 to the generator 94 (step S800). Upon receiving the generation request from the first object 18, the determiner 78 of the generator 94 determines whether or not the second class is loadable (step S802). The determiner 78 performs the determination in step S802 by determining whether or not the second identification information of the second class is stored in the sixth storage 84.

If the second identification information of the second class is determined to be stored in the sixth storage 84 (step S802: Yes), the determiner 78 transmits a request for loading the second class to the initialization determiner 96 (step S804).

Subsequently, the initialization determiner 96 determines whether or not the second manager 28 is initialized by using the seventh storage 42G (step S806). If the second manager 28 is determined to be uninitialized (step S806: No), the initialization determiner 96 transmits a request for initializing the second manager 28 to the initialization controller 98 (step S808).

Upon receiving the request for initializing the second manager 28, the initialization controller 98 initializes the second manager 28 by using the second code group stored in the second storage 16 (step S810). Subsequently, the initialization controller 98 stores initialization information indicating that the second manager 28 is initialized into the seventh storage 42G (step S812). Subsequently, the initialization controller 98 calculates a hash value of the second code group in the second storage 16 and stores the hash value into the seventh storage 42G (step S814).

Subsequently, the initialization controller 98 transmits completion of initialization to the initialization determiner 96 (step S816). Subsequently, the process proceeds to step S818.

If the second manager 28 is determined to be initialized in the determination of step S806 (step S806: Yes), the process proceeds to step S820 without performing the processing in steps S810 to S814.

In step S820, the initialization determiner 96 determines whether or not the second manager 28 is the latest (step S820).

The initialization determiner 96 performs the determination on whether or not the second manager 28 is the latest as follows. First, the initialization determiner 96 calculates a hash value of the second code group stored in the second storage 16. If the second manager 28 is initialized and the second manager 28 is also updated, the hash value calculated from the second code group stored in the second storage 16 is "Hash(B)", for example. Subsequently, the initialization determiner 96 reads the hash value associated with the first identification information of the second manager 28 stored in the seventh storage 42G. The hash value is the value stored in the seventh storage 42G at the previous update by the update controller 97. Thus, if the hash value read from the seventh storage 42G is "Hash(A)", for example, the hash value "Hash(B)" calculated by the initialization determiner 96 is not equal to the hash value "Hash(A)" stored in the seventh storage 42G. If the hash values are not equal, the initialization determiner 96 determines that the second manager 28 is not the latest.

If the second manager 28 is determined to be the latest (step S820: Yes), the process proceeds to step S818.

If the second manager 28 is not the latest (step S820: No), on the other hand, the initialization determiner 96 transmits an update request to the update controller 97 (step S822).

The update controller 97 in receipt of the update request reads the second code group from the second storage 16, and updates the second manager 28 by using the second code group (step S824). Subsequently, the update controller 97 stores the hash value (a hash value "Hash(B)", for example) of the second code group in the second storage 16 that is calculated in the determination of step S820 in association with the first identification information of the second manager 28 into the seventh storage 42G (step S826).

Figures 41, 42:
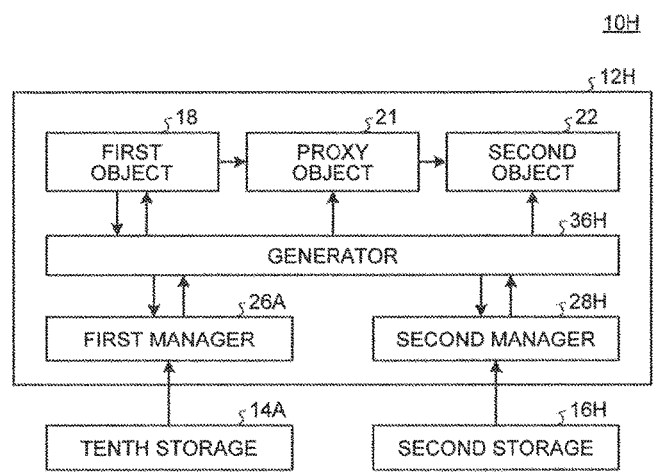
FIG. 41 is a table illustrating an example of a data structure of a seventh storage.
FIG. 42 is an explanatory diagram of an information processing device.

FIG. 41 is a table illustrating an example of the data structure of the seventh storage 42G after the processing of step S826. FIG. 41 illustrates that the second manager 28 identified by the first identification information is initialized and that the hash value of the second code group in the second storage 16 used in the previous update is "Hash(B)".

The description refers back to FIG. 40, in which the update controller 97 subsequently transmits completion of update to the initialization determiner 96 (step S828), and the process proceeds to step S818.

In step S818, the initialization determiner 96 transmits a request for loading the second class to the second manager 28 (step S818).

Subsequently, the controller 12G performs processing in steps S830 to S856 similarly to steps S116 to S140 in the first embodiment.

As described above, in the information processing device 10G according to the present embodiment, the hash value of the second code group in the second storage 16 that has been used for initializing the second manager 28 is stored in the seventh storage 42G. The information processing device 10G according to the present embodiment can therefore update the second manager 28 to the latest by using the latest second code group in addition to the effects of the embodiments described above.

Ninth Embodiment

In the present embodiment, a case in which a second manager loads an interface to be used for generating a proxy object in the second embodiment will be described. Parts that are the same as those in the embodiments described above will be designated by the same reference numerals and description thereof will not be repeated as appropriate.

FIG. 42 is an explanatory diagram of an information processing device 10H according to the present embodiment. The information processing device 10H includes a controller 12H, a tenth storage 14A, and a second storage 16H. The tenth storage 14A is the same as that in the second embodiment.

The controller 12H controls the information processing device 10H. The controller 12H executes programs written in an object-oriented programming language.

The controller 12H includes a first object 18, a proxy object 21, a second object 22, a generator 36H, a first manager 26A, and a second manager 28H. The first object 18, the proxy object 21, the second object 22, and the first manager 26A are the same as those in the second embodiment.

The controller 12H implements the first object 18, the proxy object 21, the second object 22, the generator 36H, the first manager 26A, and the second manager 28H by executing programs stored in a ROM, an HDD, or the like.

The second manager 28H loads a second class and a fourth class. The second class is the same as that in the second embodiment. The fourth class is a class in an object-oriented programming language. The fourth class is a class of an interface (hereinafter referred to as a second interface) defining methods that can be accessed by the first object 18 of the methods contained in the second object 22.

Specifically, the second manager 28H loads the second class and the fourth class from the second storage 16H. In other words, the second manager 28H generates the second class, and the fourth class of the second interface. Note that the second manager 28H is initialized at the start of program execution.

The second storage 16H stores in advance a second code group for using the second object 22, a fourth code group for using the second interface, and the like. The second code group is the same as that in the second embodiment. The fourth code group describes the fourth class.

Upon receiving a request for generating the second object 22 from the first object 18, the generator 36H generates the second object 22 from the second class. The generator 36H also generates the proxy object 21 from the third class on the basis of the fourth class of the second interface. The generator 36H then transmits the proxy object 21 to the first object 18.

Figure 43:
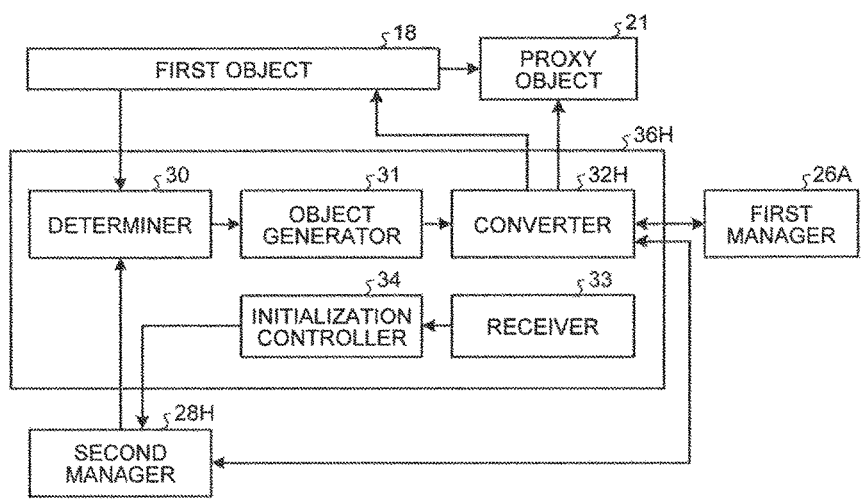
FIG. 43 is an explanatory diagram of a generator.

FIG. 43 is an explanatory diagram of the generator 36H. The generator 36H includes a determiner 30, an object generator 31, a converter 32H, an initialization controller 34, and a receiver 33. The determiner 30, the object generator 31, the initialization controller 34, and the receiver 33 are the same as those in the second embodiment.

The converter 32H acquires the fourth class from the second manager 28H. The converter 32H acquires the third class of the proxy object 21 from the first manager 26A on the basis of the fourth class acquired from the second manager 28H. The converter 32H generates the proxy object 21 from the third class. The converter 32H further transmits the proxy object 21 to the first object 18.

Figure 44:
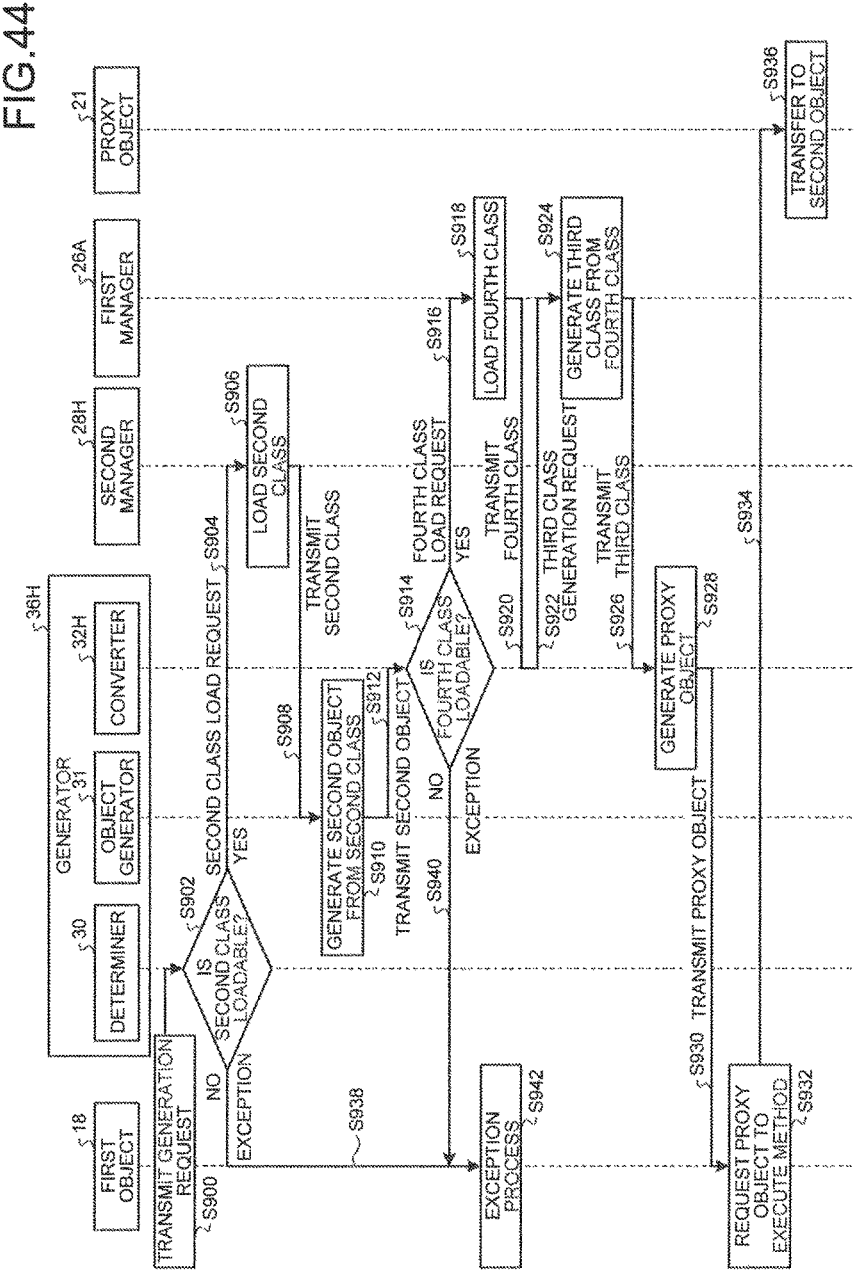
FIG. 44 is a sequence diagram illustrating an example of operation procedures of a controller.

FIG. 44 is a sequence diagram illustrating an example of operation procedures of the controller 12H when the first object 18 has transmitted a request for generating another object. Note that a case in which the first object 18 transmits a request for generating the second object 22 will be described as a specific example.

First, the controller 12H performs processing in steps S900 to S912 similarly to steps S110 to S122 (refer to FIG. 11) described in the second embodiment. Subsequently, the converter 32H determines whether or not the fourth class is loadable from the second manager 28H (step S914).

In the present embodiment, the second manager 28H loads the fourth class. The converter 32H thus determines that the fourth class is loadable (step S914: Yes). The converter 32H then transmits a request for loading the fourth class to the second manager 28H (step S916).

The second manager 28H loads the fourth class for which the load request is transmitted from the converter 32H (step S918). Subsequently, the second manager 28H transmits the fourth class to the generator 36H (step S920).

Upon receiving the fourth class from the second manager 28H, the converter 32H of the generator 36H transmits a request for generating the third class of the proxy object 21 to the first manager 26A (step S922).

Upon receiving the request for generating the third class, the first manager 26A generates the third class from the fourth class received from the converter 32H (step S924). The first manager 26A transmits the third class to the generator 36H (step S926).

Subsequently, the controller 12H performs processing in steps S928 to S936 similarly to steps S154 to S162 (refer to FIG. 11) described in the second embodiment. The controller 12H also performs processing in steps S938 to S942 similarly to steps S136 to S140 described in the second embodiment.

As described above, the information processing device 10H according to the present embodiment uses the fourth class of the second manager 28H in place of the fourth class in the first manager 26A when using the fourth class for generating the proxy object in the second embodiment.

Advantageous effects of using the fourth class of the second manager 28H will be described below.

If the fourth class is falsified by the creator of the first object 18, a proxy object 21' (not illustrated) that performs access control on the basis of an interface 20' (not illustrated) generated from the falsified fourth class' may not have an access control function equivalent to that of the proxy object 21 without falsification.

The creator of the first object 18 is typically given permission to change codes in the tenth storage 14A to correct the code group developed by himself/herself. If the fourth class is in the first manager 26A, the fourth class is initialized by the code group in the tenth storage 14A, which makes it likely that the creator of the first object 18 can make falsification. In contrast, when the fourth class is in the second manager 28H, the fourth class is initialized by the code group in the second storage 16H, but it is less likely that the creator of the first object 18 can make falsification if the permission to modify the second storage 16H is properly limited.

Thus, even if a class in the first manager 26A or a code group in the tenth storage 14A are falsified by the creator of the first object 18, methods that can be accessed from the first object 18 of the methods contained in the second object 22 are limited (by the proxy object 21) to those contained in (the interface 20 generated from) the fourth class that is not falsified in the second manager 28H.

The information processing device 10H according to the present embodiment can therefore limit access from other objects depending on methods contained in an object.

The storages described in the embodiments can be any typically used storage media such as HDDs, optical discs, memory cards, and random access memories (RAM).

Figure 47:
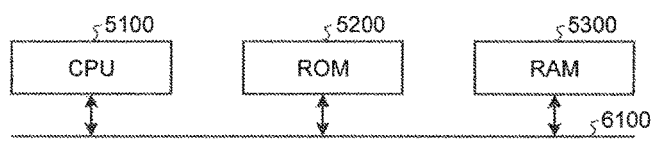
FIG. 47 is an explanatory diagram illustrating a hardware configuration of an information processing device.

Next, a hardware configuration of the information processing devices 10, 10A, 10B, 10C, 10D, 10E, 10F, and 10G according to the embodiments will be described. FIG. 47 is an explanatory diagram illustrating a hardware configuration of the information processing devices 10, 10A, 10B, 10C, 10D, 10E, 10F, and 10G according to the embodiments.

The information processing devices 10, 10A, 10B, 10C, 10D, 10E, 10F, and 10G according to the embodiments each include a control unit such as a central processing unit (CPU) 5100, storages such as a read only memory (ROM) 5200 and a RAM 5300, and a bus 6100 that connects these units.

Programs for implementing the information processing devices 10, 10A, 10B, 10C, 10D, 10E, 10F, and 10G according to the embodiments are embedded on the ROM 5200, the RAM 5300 or the like in advance and provided therefrom.

Programs for executing the processes performed by each of the information processing devices 10, 10A, 10B, 10C, 10D, 10E, 10F, and 10G according to the embodiments may be recorded on a computer readable recording medium such as a compact disk read only memory (CD-ROM), a flexible disk (FD), a compact disk recordable (CD-R), and a digital versatile disk (DVD) in a form of a file that can be installed or executed, and provided as a computer program product.

Furthermore, the programs for implementing the information processing devices 10, 10A, 10B, 10C, 10D, 10E, 10F, and 10G according to the embodiments may be stored on a computer system connected to a network such as the Internet, and provided by being downloaded via the network. Alternatively, the programs to be executed by the devices according to the embodiments may be provided or distributed through a network such as the Internet.

The programs for executing the processes performed by each of the information processing devices 10, 10A, 10B, 10C, 10D, 10E, 10F, and 10G according to the embodiments can make a computer function as the respective units described above. In the computer, the CPU 5100 can read out programs from a computer-readable storage medium onto a main storage and execute the programs.

While certain embodiments of the present invention have been described, these embodiments have been presented by way of example only, and are not intended to limit the scope of the inventions.

For example, Java (registered trademark) is mentioned as an example of the object-oriented programming language in the embodiments described above, the object-oriented programming language is not limited thereto. For example, programs written in the C# language may be used, and programs written in other languages may be used.

Furthermore, the embodiments may be combined. For example, for preventing unauthorized use through falsification of an interface or a second storage, the ninth embodiment and the fourth embodiment can be combined.

Figure 45:
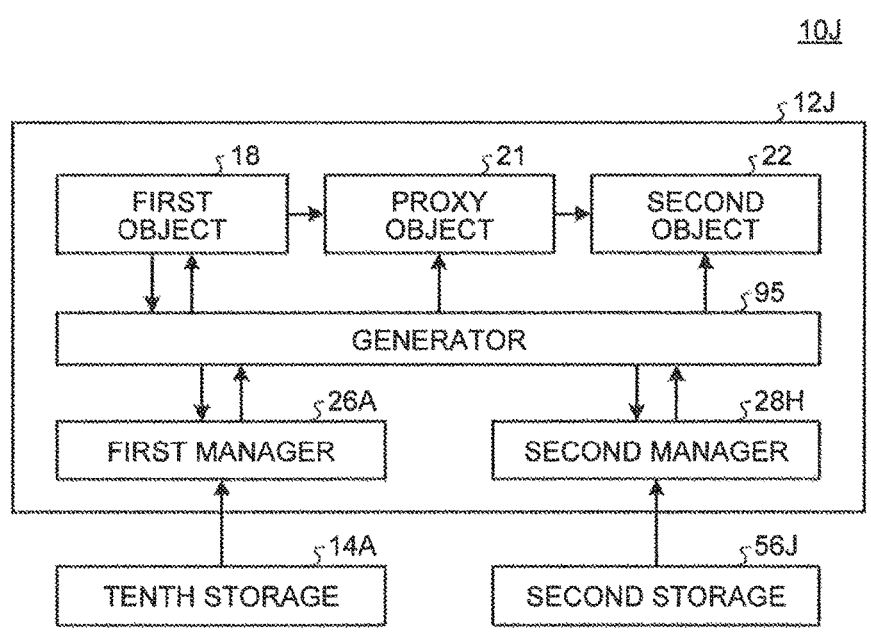
FIG. 45 is a block diagram illustrating an information processing device.

FIG. 45 is a block diagram of an information processing device 10J combining the ninth embodiment and the fourth embodiment. The information processing device 10J includes a controller 12J, a tenth storage 14, and a second storage 56J. The tenth storage 14A is the same as that in the ninth embodiment.

The controller 12J controls the information processing device 10J. The controller 12J executes programs written in an object-oriented programming language. The controller 12J includes a first object 18, a proxy object 21, a second object 22, a generator 95, a first manager 26A, and a second manager 28H.

The controller 12J implements the first object 18, the proxy object 21, the second object 22, the generator 95, the first manager 26A, and the second manager 28H by executing programs stored in a ROM, an HDD, or the like.

The first object 18, the proxy object 21, the second object 22, the first manager 26A, and the second manager 28H have the same configuration as those in the ninth embodiment.

The second storage 56J stores in advance a second code group for using the second object 22, a fourth code group for using the interface 20, and the like. Thus, the second storage 56J stores encrypted data of the second class of the second object 22 and the fourth class of the interface 20.

Figure 46:
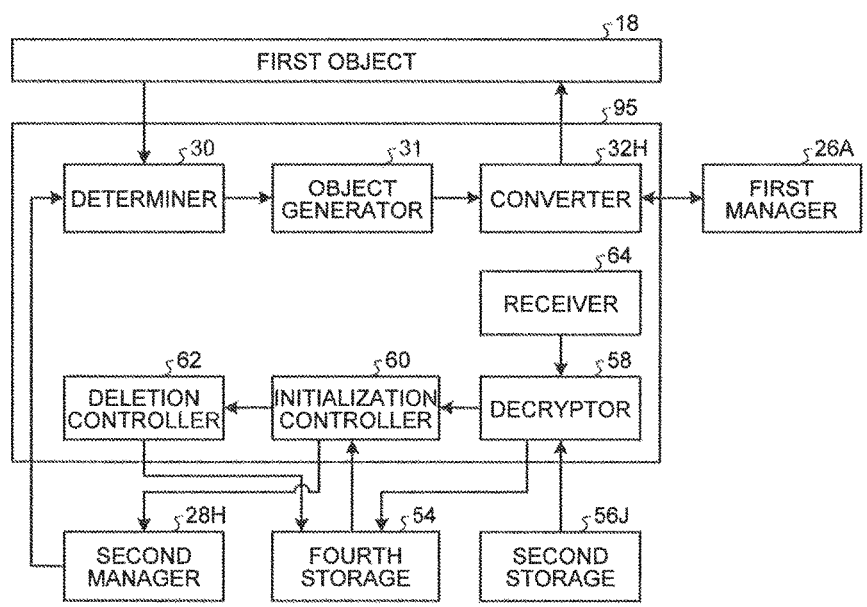
FIG. 46 is an explanatory diagram of a generator.

FIG. 46 is an explanatory diagram of the generator 95. The generator 95 includes a determiner 30, an object generator 31, a converter 32H, a deletion controller 62, an initialization controller 60, a receiver 64, and a decryptor 58. The determiner 30, the object generator 31, and the converter 32H are the same as those in the ninth embodiment. The deletion controller 62, the initialization controller 60, the receiver 64, and the decryptor 58 are the same as those in the fourth embodiment. Processing procedures are combination of those in the sequence diagrams described in the ninth embodiment and the fourth embodiment.

As a result of combining the embodiments in this manner, the advantageous effects of the respective embodiments can also be combined. In this example, the advantageous effect of "preventing unauthorized use through falsification of an interface" in the ninth embodiment and the advantageous effect of "preventing unauthorized use through falsification of a second storage" in the fourth embodiment can be implemented.

Although examples in which the number of objects (first object 18) requesting execution is one and examples in which the number of objects (second object 22) requested to execute methods is one or two are described in the embodiments, the embodiments are not limited thereto. For example, the number of the first objects 18 requesting execution and the number of the second objects 22 requested to execute methods may be one or more than one (three or more).

Furthermore, the cases in which files are used are described as examples of implementing the information processing device 10 and the second storage 16 in the embodiments (refer to the main file J14 in FIG. 5, the main file J14A in FIG. 12, and the library file J16 in FIGS. 5 and 12). The manner in which the second storage 16, however, is implemented is not limited to a file. For example, the tenth storage 14 and the second storage 16 may be information indicating locations (addresses) of data in a network. In this case, the respective functional units may acquire code groups and data from the locations indicated by the addresses via the network.

Furthermore, the cases in which the interface 20 functions as a controller are described in the third to eighth embodiments. In the third to eight embodiments, however, a configuration including a proxy object 21 in place of the interface 20 may be used similarly to the second embodiment.

In the embodiments, it is required that the information processing device be not partially or entirely falsified to limit access to a second object from a first object. For example, one desirable method for realizing this requirement is that the information processing device is partially or entirely written in a machine language such as the C language or the C++ language. Furthermore, to make protection of part of or the whole of the information processing device robust, it is desired to apply software obfuscation to part or the whole of the information processing device.

Furthermore, the objects (such as the first object 18 and the second object 22) and the interfaces (such as the interface 20) described in the embodiments may operate on the same computer or may operate in a state distributed among several computers.

Furthermore, the information processing devices 10, 10A, 10B, 10C, 10D, 10E, 10F, 10G, 10H, and 10J according to the embodiments may be made of one device or may be constituted by a plurality of devices connected via a network.

Specifically, the information processing devices 10, 10A, 10B, 10C, 10D, 10E, 10F, 10G, 10H, and 10J according to the embodiments are personal computers. The information processing devices 10, 10A, 10B, 10C, 10D, 10E, 10F, 10G, 10H, and 10J according to the embodiments, however, are not limited to personal computers. For example, the information processing devices 10, 10A, 10B, 10C, 10D, 10E, 10F, 10G, 10H, and 10J according to the embodiments may be arithmetic processing units, microcomputers, or the like included in information processing equipment, and may be any equipment or devices that can implement the functions using programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a first manager configured to load a first class of a first object that requests execution of methods contained in a second object and a third class of a limiter that has a method accessible by the first object of the methods contained in the second object, the method of the limiter being defined in advance and being configured to limit access from the first object only to a subset of the methods contained in the second object, the first manager being a classloader;
a second manager configured to load a second class of the second object and a fourth class of a fourth object, the methods of the second object being configured to permit access to the fourth object, the second manager being a classloader that is different from the first manager, the second object containing methods to which the access from the first object is limited; and
a generator configured to generate the second object from the second class upon receiving a generation request for generating the second object from the first object, generate the limiter from the second object and the third class, and transmit the limiter to the first object, wherein
the limiter is further configured to limit access from the first object whose first class is loaded by the first manager to the second object whose second class is loaded by the second manager even when the first object uses reflection.

2. The device according to claim 1, wherein upon receiving the limiter, the first object transmits a request for executing the methods to the second object through the limiter.

3. The device according to claim 1, wherein the limiter is an interface defining methods accessible from the first object of the methods contained in the second object.

4. The device according to claim 1, wherein the generator includes an initialization controller configured to initialize the second manager upon receiving an initialization request from the first object.

5. The device according to claim 1, wherein
the limiter is a proxy object configured to transfer a request for calling methods accessible from the first object of the methods contained in the second object to the second object upon receiving a request for executing the methods from the first object,
the first manager loads the first class, the third class, and a fourth class of an interface defining methods accessible from the first object of the methods contained in the second object, and
upon receiving the generation request, the generator generates the second object from the second class, generates the limiter from the third class on the basis of the fourth class, and transmits the limiter to the first object.

6. The device according to claim 1, wherein
the limiter is a proxy object configured to transfer a request for calling methods accessible from the first object of the methods contained in the second object to the second object upon receiving a request for executing the methods from the first object,
the first manager loads the first class and the third class of the methods contained in the second object,
the second manager defines methods accessible from the first object and loads a fourth class of an interface to be used for generation of the limiter, and
upon receiving the generation request, the generator generates the second object from the second class, generates the limiter from the third class on the basis of the fourth class, and transmits the limiter to the first object.

7. The device according to claim 1, comprising:
a plurality of second managers configured to load second classes of a plurality of second objects individually;
a plurality of the limiters configured to individually limit access to methods contained in the respective second objects; and
a first storage configured to store second identification information of each of the second classes and third identification information of each of the third classes in association with each other, wherein
the first manager loads the first class and the third classes, and
upon receiving the generation request, the generator generates the second object requested to be generated from the second class of the second object, generates the limiter from the third class identified by the third identification information associated with the second identification information of the second class and from the second object, and transmits the limiter to the first object.

8. The device according to claim 7, wherein
the generator includes an initialization controller configured to initialize the second manager upon receiving an initialization request from the first object, and
upon receiving the generation request, the generator generates the second object requested to be generated from the second class of the second object, the second class being loaded by the second manager that is initialized, generates the limiter from the third class identified by the third identification information associated with the second identification information of the second class and from the second object, and transmits the limiter to the first object.

9. The device according to claim 4, further comprising:
a second storage configured to store encrypted data of a second code group describing the second class;
a fourth storage that is not accessible from the first object; and
a decryptor configured to store decrypted data resulting from decrypting the encrypted data into the fourth storage, wherein
the initialization controller initializes the second manager by using the decrypted data.

10. The device according to claim 9, comprising a deletion controller configured to delete the decrypted data from the fourth storage after the second manager is initialized by the initialization controller.

11. The device according to claim 8, comprising:
a plurality of second storages configured to individually stores a plurality of pieces of encrypted data; and
a fifth storage configured to store third identification information identifying each of the second storages and a decryption key in association with each other, wherein
the decryptor stores a plurality of pieces of decrypted data resulting from decrypting the encrypted data acquired from the respective second storages by using the decryption keys associated with the third identification information into the fourth storage, and
the initialization controller initializes the second managers by using the plurality of pieces of decrypted data.

12. The device according to claim 1, comprising a second storage configured to store a second code group describing the second class, wherein
the generator includes:
a determiner configured to determine whether or not the second manager is initialized upon receiving the generation request; and
an initialization controller configured to initialize the second manager by using the second code group when the second manager is determined to be uninitialized.

13. The device according to claim 12, comprising a plurality of second managers configured to load the second classes of the respective second objects individually, wherein
upon receiving the generation request, the determiner determines whether or not the second manager that loads the second class of the second object requested to be generated of the plurality of second managers is initialized, and
the initialization controller initializes the second manager determined to be uninitialized of the plurality of second managers.

14. The device according to claim 12, wherein the generator includes:
a seventh storage configured to store first identification information of the second manager and a hash value calculated from the second code group used for initializing the second manager identified by the first identification information in association with each other;
an initialization determiner configured to determine whether or not a hash value calculated from the second code group stored in the second storage and a hash value stored in the second storage are equal upon receiving the generation request; and
an update controller configured to update the second manager by using the second code group stored in the second storage if the hash values are determined not to equal, and then store the hash value of the second code group in the seventh storage.

15. An information processing method comprising:
loading, by a first manager, a first class of a first object requesting execution of methods contained in a second object and a third class of a limiter that has a method accessible by the first object of the methods contained in the second object, the method of the limiter being defined in advance and being configured to limit access from the first object only to a subset of the methods contained in the second object, the first manager being as classloader;
loading, by a second manager, a second class of the second object and a fourth class of a fourth object, the methods of the second object being configured to permit access to the fourth object, the second manager being a classloader that is different from the first manager, the second object containing methods to which the access from the first object is limited; and
generating the second object from the second class upon receiving a request for generating the second object from the first object, generating the limiter from the second object and the third class, and transmitting the limiter to the first object, wherein
the limiter is further configured to limit access from the first object whose first class is loaded by the first manager to the second object whose second class is loaded by the second manager even when the first object uses reflection.

16. A computer program product comprising a non-transitory computer-readable medium containing a computer program, the program causing a computer to execute:
loading, by a first manager, a first class of a first object requesting execution of methods contained in a second object and a third class of a limiter that has a method accessible by the first object of the methods contained in the second object, the method of the limiter being defined in advance and being configured to limit access from the first object only to a subset of the methods contained in the second object, the first manager being a classloader;
loading, by a second manager, a second class of the second object and a fourth class of a fourth object, the methods of the second object being configured to permit access to the fourth object, the second manager being a classloader that is different from the first manager, the second object containing methods to which the access from the first object is limited; and
generating the second object from the second class upon receiving a request for generating the second object from the first object, generating the limiter from the second object and the third class, and transmitting the limiter to the first object, wherein
the limiter is further configured to limit access from the first object whose first class is loaded by the first manager to the second object whose second class is loaded by the second manager even when the first object uses reflection.

* * * * *